(12) United States Patent
Soshi et al.

(10) Patent No.: US 6,337,954 B1
(45) Date of Patent: *__Jan. 8, 2002__

(54) CAMERA HAVING A DISPLAY UNIT INCLUDING MULTIPLE DISPLAY AREAS AND A CONNECTOR MOUNTED PARALLEL TO SAID MULTIPLE DISPLAY AREAS

(75) Inventors: Isao Soshi, Tokyo; Hidenori Miyamoto, Urayasu, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,103

(22) Filed: Sep. 30, 1997

Related U.S. Application Data

(63) Continuation of application No. 08/712,181, filed on Sep. 11, 1996, now abandoned, which is a continuation of application No. 08/187,867, filed on Jan. 28, 1994, now abandoned.

(30) Foreign Application Priority Data

Jan. 28, 1993 (JP) ............................................ 05-012899
Jan. 29, 1993 (JP) ........................................... 05-013292

(51) Int. Cl.[7] .............................................. G03B 17/18
(52) U.S. Cl. ...................... 396/287; 396/542; 349/142
(58) Field of Search ............................... 396/281, 287, 396/290, 291, 292, 295, 535, 542; 349/142, 139, 141

(56) References Cited

U.S. PATENT DOCUMENTS

| 4,483,601 A | * | 11/1984 | Sekida et al. | |
| 4,652,932 A | * | 3/1987 | Miyajima et al. | |
| 4,815,824 A | * | 3/1989 | Sharples | 350/336 |
| 5,016,034 A | * | 5/1991 | Goto | 354/289.12 X |
| 5,130,742 A | * | 7/1992 | Miyamoto et al. | 354/475 |
| 5,227,831 A | * | 7/1993 | Miyazaki et al. | 354/475 X |
| 5,253,010 A | * | 10/1993 | Oku et al. | |
| 5,258,805 A | * | 11/1993 | Aoki et al. | 354/475 |
| 5,309,194 A | * | 5/1994 | Itabashi | |
| 5,537,177 A | * | 7/1996 | Terunuma | |
| 5,565,955 A | * | 10/1996 | Soshi et al. | |
| 5,802,407 A | * | 9/1998 | Wakabayashi et al. | 396/287 |

FOREIGN PATENT DOCUMENTS

JP 5-181185 * 7/1993

* cited by examiner

*Primary Examiner*—David M. Gray

(57) ABSTRACT

A display device adapted for use with a camera is equipped with circuitry for monitoring and controlling camera operation. The display device includes a display unit having a first display part which shows a photographic mode indication, a second display part which shows calendar information (e.g., date and time information), and a connector designed to electronically connect the display device to the circuitry. The connector is mounted in the camera in parallel relation to the first display part and to the second display part. The second display part is mounted near the connector and in closer proximity to the connector than the first display part. Additionally, a control device for controlling the drive characteristics of a display device adapted for use in a camera is provided. The control device includes a plurality of main contacts which are connected to at least one of a first display device which has a respectively associated plurality of contacts and which displays date information and a second display device which has a respectively associated plurality of contacts and which displays photographic information other than date information. Additionally, the control device includes a drive unit which causes date information to be displayed on the first display device when the plurality of main contacts are connected to the respectively associated plurality of contacts of the first display device, and which causes photographic information other than date information to be displayed on the second display when the plurality of main contacts are connected to the respectively associated plurality of contacts of the second display.

10 Claims, 19 Drawing Sheets

OFF

CAMERA HAVING A DISPLAY UNIT INCLUDING MULTIPLE DISPLAY AREAS AND A CONNECTOR MOUNTED PARALLEL TO SAID MULTIPLE DISPLAY AREAS

This application is a continuation of application Ser. No. 08/712,181, filed Sep. 11, 1996, now abandoned, which is a continuation of application Ser. No. 08/187,867, filed Jan. 28, 1994, now abandoned.

BACKGROUND OF THE INVENTION

1. Field of the Invention

The present invention relates to display devices used in cameras. More particularly, the present invention relates to devices used to control drive characteristics of such display devices. Even more particularly, the present invention relates to a display device adapted for mounting in a camera that is capable of displaying at least one photographic mode and date and time information.

2. Description of the Related Art

Cameras which transcribe date and time information onto a film surface and which are provided with so-called "date imprint" technology are well known. Typically, such cameras are equipped with a plurality of imprinting modes such as "year-month-day" and "date-hour-minutes" modes.

Accordingly, in order for a camera user to select an imprint mode, it is indispensable to have a mode indicator unit and a calendar function display unit for displaying the date and time which will be imprinted during operation of a date imprint function.

In addition to date imprinting features, cameras are often provided with a plurality of photographic modes such as a self-timer mode and a strobe light emission inhibition and compulsory light emission mode. Cameras so equipped are also well known. Typically, these cameras are provided with a selection unit which allows a camera user to select among various camera operation modes which may be displayed on a liquid crystal display (LCD) device.

Cameras, which are equipped with technology related to selecting and displaying date imprint and operation mode selections, often realize the following problems.

First, in order to display the calendar function related to date imprinting and the plurality of photographic modes on a single LCD display, a relatively large space is required for the LCD display. As such, mounting such a multi-function LCD display on a camera body is often difficult, if not impossible, to achieve.

As a result of the aforementioned space problem, the LCD display is usually disposed on a rear side of a camera which has a relatively wide space. However, mounting the LCD display on the back of a camera body results in further problems associated with camera body design and operation.

Second, the required sizes of such multi-function LCD displays often dictate increased implementation costs.

Finally, segmented LCD displays are often used for providing a calendar function display. As such, electronic connection between the segments of a segmented LCD display and related circuitry must be provided inside a camera. In the case of the calendar function display, the number of segments used is large compared to a normal display, thus necessitating a complex wiring and connection arrangement, especially when such an LCD display is disposed on a moving back member of a camera body. Accordingly, the number of wiring patterns which are connected to these segments must be made large. If wiring patterns in the LCD display exist in large number and are made to extend lengthwise, the degree of freedom in the arrangement of other display components is often lost.

Turning now to the drive characteristics of camera display devices, the related art is summarized as follows. According to differences in the design of the display part of the camera, different liquid crystal control drive devices have been designed and produced. Consequently, even with the same type of camera, it has been necessary to prepare different control drive devices according to whether the camera model has a date display or not. This contributes to poor productivity and increased design and implementation costs.

SUMMARY OF THE INVENTION

Accordingly, it is an object of the present invention to solve the above-enumerated problems associated with providing information display devices in cameras.

It is a further object of the present invention to provide a display device in which the connector which electronically connects the display device to necessary support circuitry does not exercise any influence on the freedom of arrangement and/or placement of such necessary support circuitry.

It is an object of the present invention to attach identical control drive devices to different types of liquid crystal displays in such a way that the respective liquid crystal displays operate appropriately.

It is yet a further object of the present invention to provide a display device which can be configured to display calendar (e.g., date) information and/or other photographic information.

It is still another object of the present invention to provide a display device for displaying photographic information in accordance with operational criteria stored in a non-volatile memory.

Additional objects and advantages of the invention will be set forth in part in the description which follows, and, in part, will be obvious from the description, or may learned by practice of the invention.

The foregoing objects of the present invention are achieved by providing a display device adapted for use with a camera equipped with circuitry for monitoring and controlling camera operation. The display device includes a display unit having a first display part which shows a photographic mode indication, a second display part which shows calendar information (e.g., date and time information), and a connector designed to electronically connect the display device to the circuitry. The connector is mounted in the camera in parallel relation to the first display part and to the second display part. The second display part is mounted near the connector and in closer proximity to the connector than the first display part.

Finally, the above-listed objects are achieved by the present invention in that a control device for controlling the drive characteristics of a display device adapted for use in a camera is provided. The control device includes a plurality of main contacts which are connected to one of a first display device which comprises a respectively associated plurality of contacts and which displays date information and a second display device which comprises a respectively associated plurality of contacts and which displays photographic information other than date information. Additionally, the control device includes a drive unit which causes date information to be displayed on the first display device when the plurality of main contacts are connected to the respectively associated plurality of contacts of the first display device, and which causes photographic information other than date information to be displayed on the second display device when the plurality of main contacts are connected to the respectively associated plurality of contacts of the second display device.

BRIEF DESCRIPTION OF THE DRAWINGS

These and other objects and advantages of the invention will become apparent and more readily appreciated from the following description of the preferred embodiments, taken in conjunction with the accompanying drawings in which.

DETAILED DESCRIPTION OF THE PREFERRED EMBODIMENTS

Figure 1:
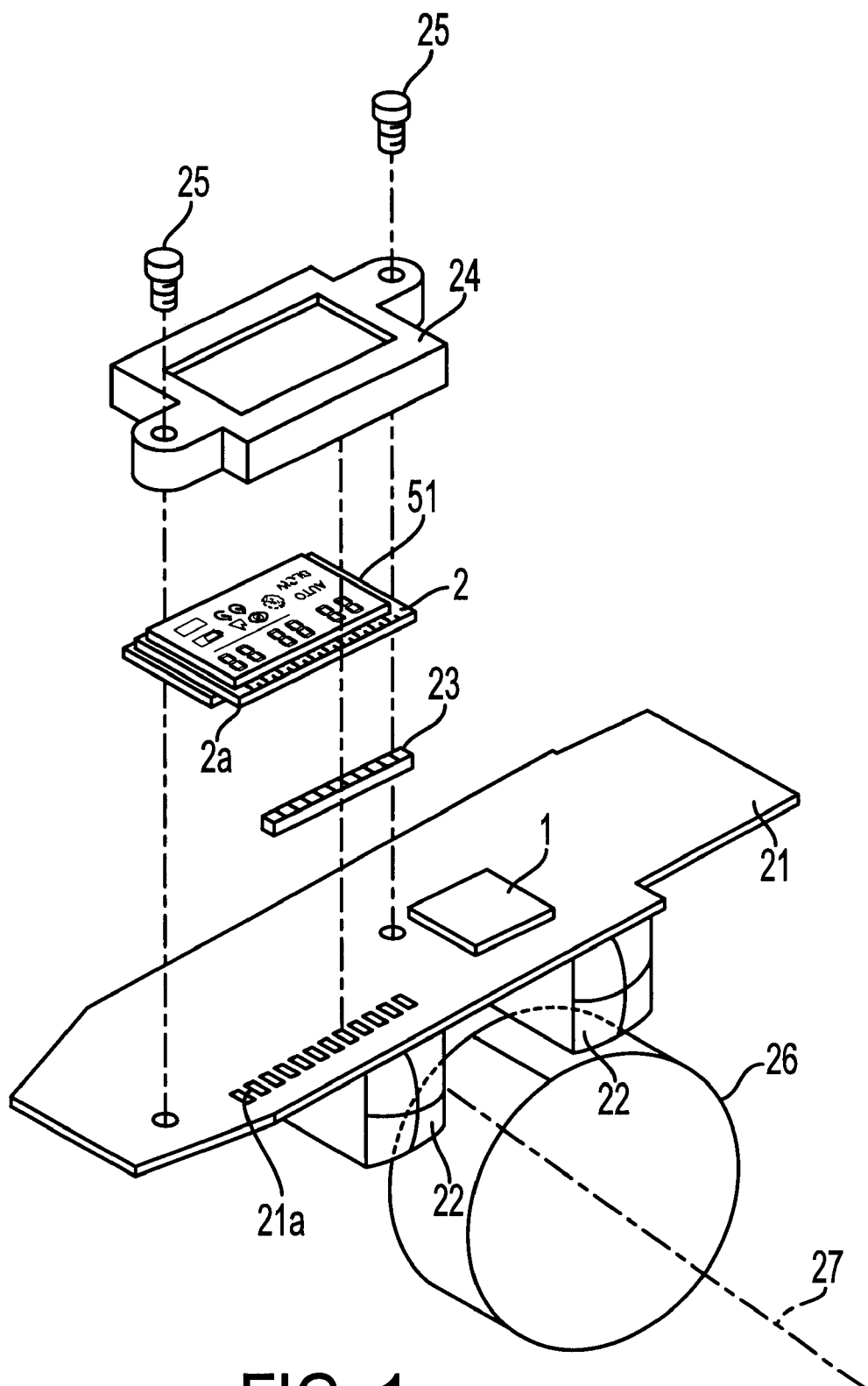
FIG. 1 is an oblique, exploded view of an LCD display unit according to an embodiment of the present invention.

Reference will now be made in detail to the present preferred embodiments of the present invention, examples of which are illustrated in the accompanying drawings which were briefly described above. Where appropriate, like reference numerals refer to like elements throughout the drawings and in the discussion found herein.

Display Configuration

Figure 5:
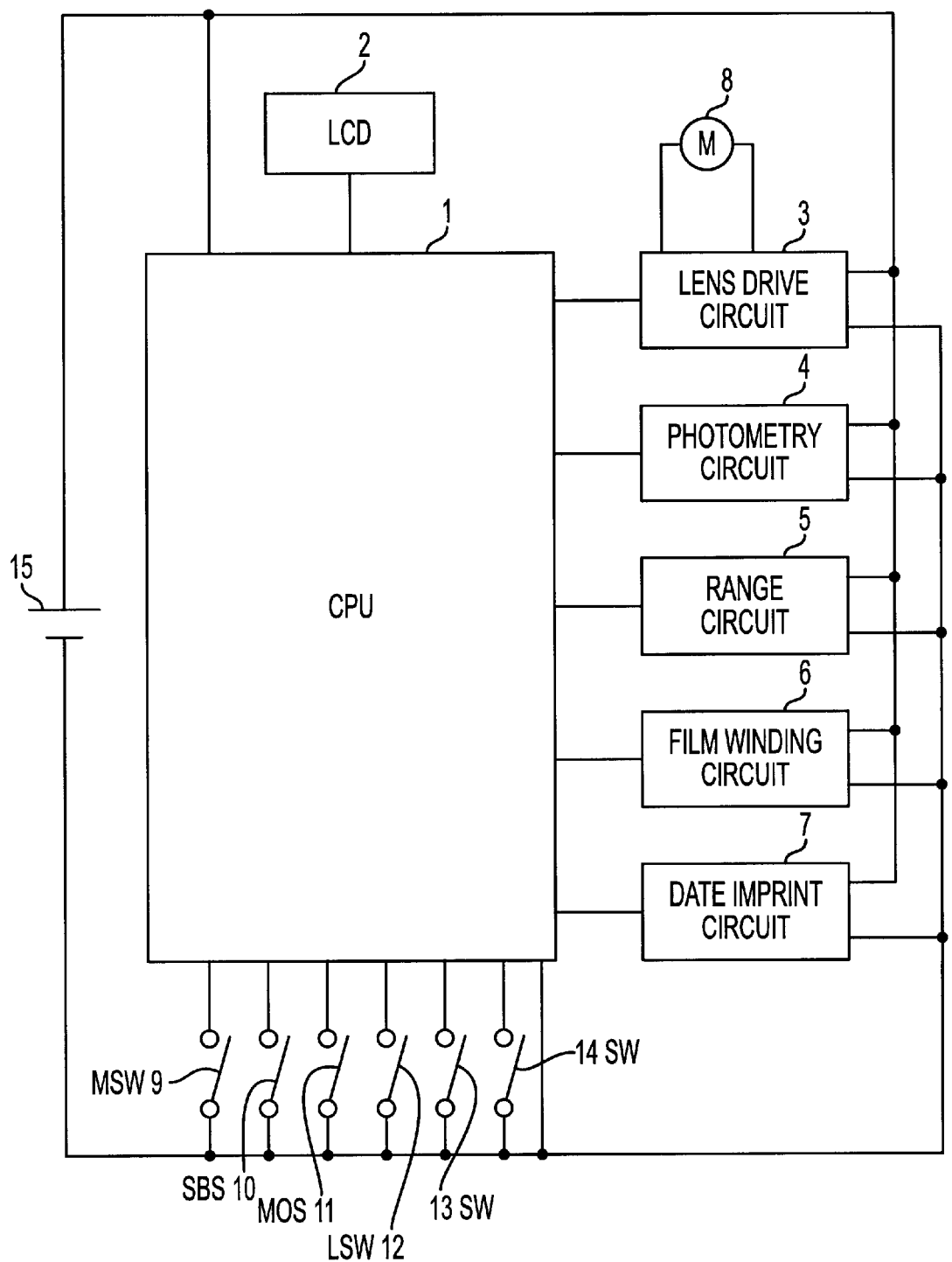
FIG. 5 is a circuit diagram of an embodiment of the present invention.

Referring now to FIG. 5, therein depicted is a circuit diagram with a display device of camera in accordance with an embodiment of the present invention. Main switch (MSW) 9 causes camera operation to commence. Strobe switch (SBS) 10 is designed to select a strobe photographic mode. Mode switch (MOS) 11 is designed to select a self-timer photographic mode. Half-push switch 12 is turned ON by pushing in the release button halfway. Release switch 13 is turned ON by fully pushing in the release button. Finally, lens barrel position detection switch SW 14 is designed to detect the position of the lens barrel. The aforementioned switches are connected to microcomputer CPU 1. With the exception of lens barrel position detection switch SW 14, all are momentary switches—when the user's hand is released, the switch automatically returns to its original position.

Additionally, the liquid crystal display (LCD) 2, the lens barrel drive circuit 3, the photometry circuit 4, the range circuit 5, the film winding circuit 6, and the date imprint circuit 7 are operatively connected to each other in conventional ways. The LCD is arranged on top of the camera body and, in accordance with the output signals of the CPU 1, externally displays the required information such as the setting of the photographic mode and the setting of the date imprint mode.

The motor 8, which is designed to drive the lens barrel, is connected to the lens barrel drive circuit 3. The lens barrel drive circuit 3 drives the lens barrel with the required timing parameters which are set according to instructions by the CPU 1. The photometry circuit 4 measures the luminance of the object to be photographed with required timing parameters according to instructions by the CPU 1, and, in turn, transfers its measurements to CPU 1. The range circuit 5 measures the distance of the object with the required timing parameters according to instructions from CPU 1, and, in turn, transfers range results to CPU 1. The film winding circuit 6 winds a frame of film according to instructions from CPU 1. The date imprint circuit 7 transcribes the data in the CPU 1 onto the film surface in accordance with instructions from CPU 1. The battery 15 is connected to and supplies power in a conventional way to CPU 1, the lens barrel drive circuit 3, photometry circuit 4, range circuit 5, film winding circuit 6, and date imprint circuit 7.

CPU 1 is preferably a one chip microcomputer, and is configured to control all operational sequences of a camera.

Furthermore, CPU 1 also contains logic and structure for driving the LCD.

In the present embodiment, the strobe mode comprises three types: red-eye reduction and automatic light emission, light emission inhibition, and compulsory light emission. Moreover, the photographic mode comprises three types: compulsory unlimited distance photography, normal photography, and self-timer photography. Furthermore, the date mode comprises five modes: year-month-day, month-day-year, day-month-year, day-hour-minutes, and OFF.

Referring now to FIG. 1, therein depicted is an oblique, exploded view of an LCD display unit according to an embodiment of the present invention. An LCD display connection terminal part 21a is arranged on top of a main camera substrate 21 which holds the CPU 1 and an Auto-Focus (AF) light projection/reception part 22. LCD connection terminal part 2a is electrically connected with the main camera substrate 21 by connector 23. LCD 2 holds calendar function display part 51 which is configured to provide date imprint functionality. This LCD 2 is fixed to the main camera substrate 21 by locking screws 25 via LCD keep plate 24. In this embodiment, reference numeral 26 indicates a photo-optical system of the camera, and reference numeral 27 indicates the optical axis of the photo-optical system 26.

Figure 2:
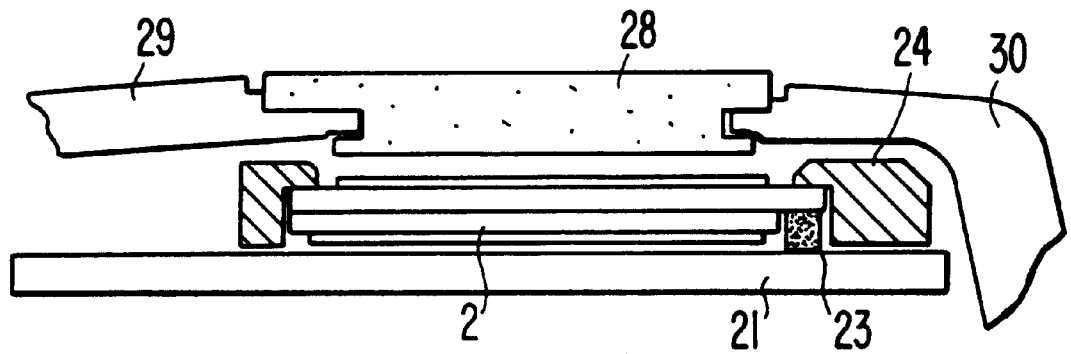
FIG. 2 is a cross-sectional view of an LCD display unit according to an embodiment of the present invention.

Referring now to FIG. 2, therein depicted is a cross-sectional view of the LCD display unit according to the present embodiment, and represents a cross-section of the upper part of the camera. More particularly, reference numeral 28 indicates an LCD window which is fastened between a camera front cover 30 and a camera rear cover 29. The LCD 2 is held down by the LCD keep plate 24 so that it electronically connects with the main camera substrate 21 via connector 23. Additionally, LCD 2 is arranged in the comparatively narrow space at the top face of the camera.

Figure 3:
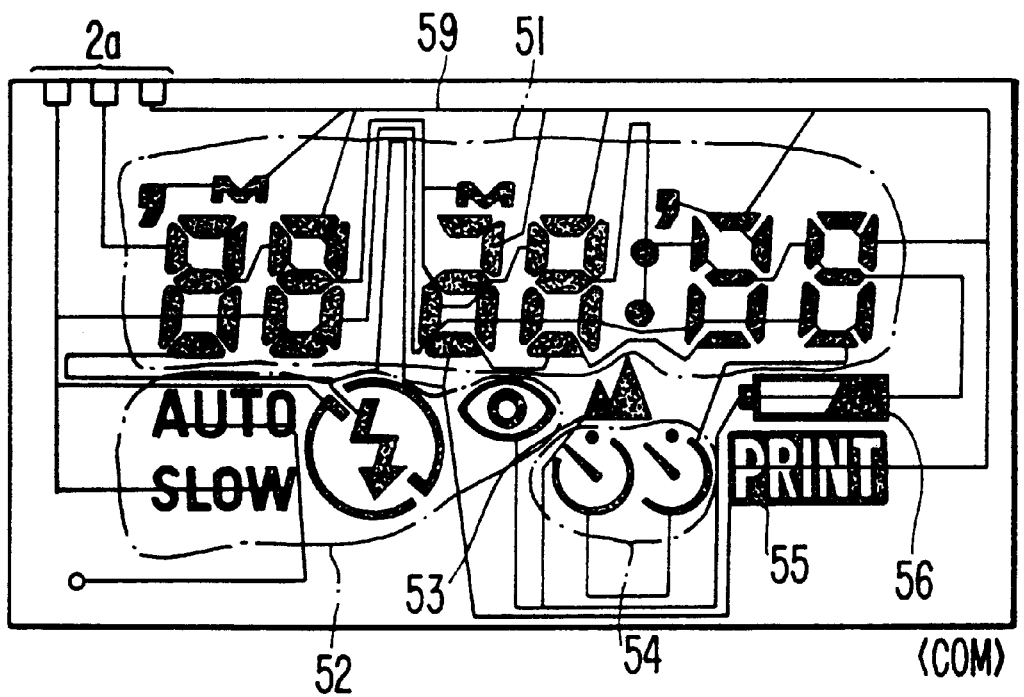
FIG. 3 is a view illustrating display contents and the corresponding wiring patterns of an LCD display unit according to an embodiment of the present invention.
Figure 4:
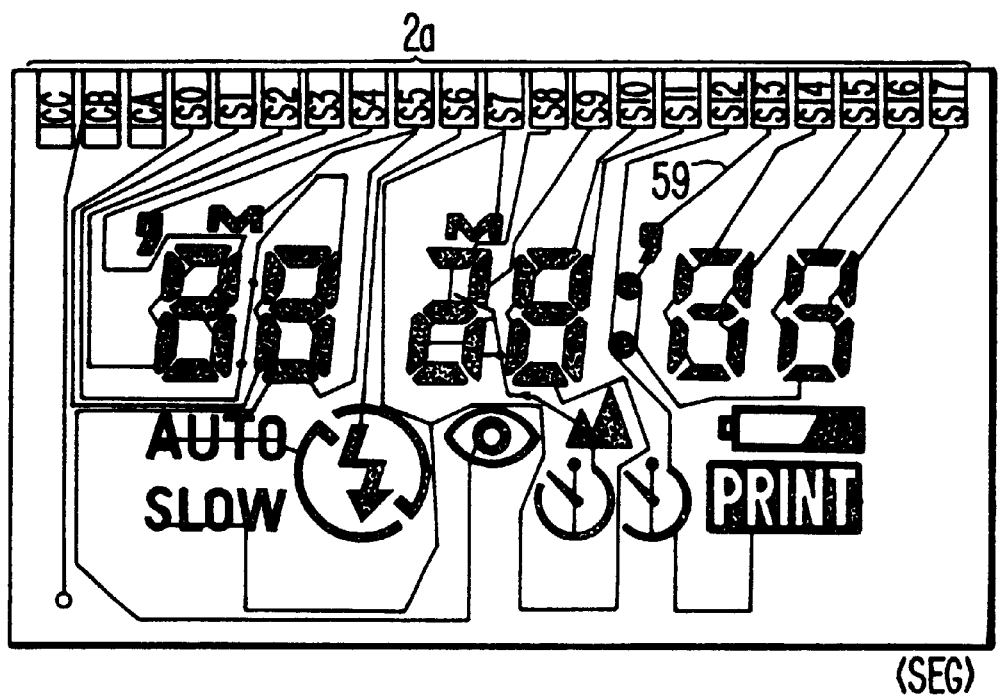
FIG. 4 is a view illustrating display contents and the corresponding wiring patterns of an LCD display unit according to an embodiment of the present invention.

Referring now to FIGS. 3 and 4, therein depicted are drawings illustrating the display contents and the corresponding wiring patterns of an LCD display unit according to an embodiment of the present invention.

In FIG. 3, a calendar function display part 51 configured for providing date imprint functionality is disposed at the upper half of the LCD 2. In the lower half of LCD 2, there are arranged the display part for various strobe modes 52, compulsory unlimited distance photographic mode display part 53, self-timer display part 54, date photography display part 55, and battery capacity warning display part 56. In order to limit the length of wiring pattern 59 inside the LCD 2 as much as possible without excessive implementation hassle, the calendar function display part 51 which uses many LCD segments is arranged in close proximity to the LCD connection terminal part 2a. In this way, the freedom of arrangement of each display segment is increased, the intervals between the displays can be reduced as much as possible, and downsizing of the LCD 2 is made possible.

With regard to the present embodiment, the connection terminal is provided at only one end of the LCD panel, but one is not necessarily limited to this design, and it is also acceptable to provide a connection terminal at the end which is approximately orthogonal or otherwise arranged to that end.

According to one aspect of the present invention, LCD panel 2 includes a calendar function display part designed for providing date imprint functionality and display of information. Since a calendar function display part is provided in close proximity to a connection terminal part of the LCD panel, the degree of freedom realized in regard to providing an appropriate wiring pattern inside LCD panel 2 increases even when downsizing of the LCD is required.

Moreover, by enabling the capabilities of a calendar function display for purposes of the date imprint function as well as a plurality of other photographic mode displays even with a small LCD, costs can be decreased.

Furthermore, as the embodiment of the present invention provides an LCD display that can be arranged in a place with little space, such as the top face of the camera, the LCD display can be disposed in a place which is good for visibility.

Display Control

Figure 6:
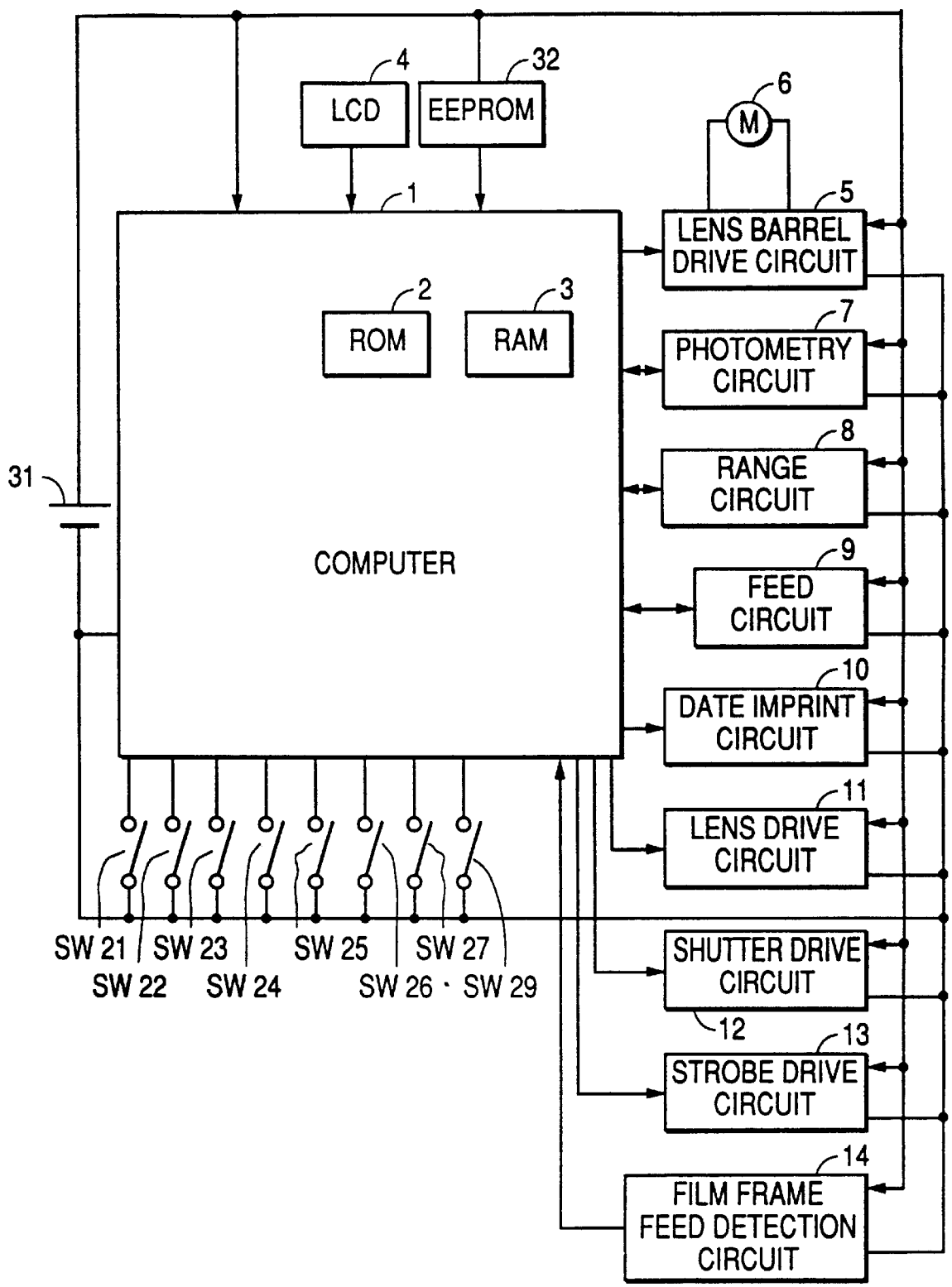
FIG. 6 is a block diagram which shows a camera equipped with a date display arrangement according to a first embodiment of the present invention.

Referring now to FIG. 6, therein depicted is a block diagram which shows a camera equipped with a date display arrangement according to an embodiment of the present invention. As is readily apparent from the drawing, switches are connected to the microcomputer 1 to control the operation of the camera. A main switch (MSW) 21, a strobe switch (SBS) 22, a mode switch (MOS) 23, a half-push switch (half-push SW) 24, a release switch (release SW) 25, a lens barrel position detection switch (SW) 26, a battery cover switch 27 and a back cover switch 29 are shown.

Main switch (MSW) 21 is operated when commencing camera operation, the strobe switch (SBS) 22 when selecting the strobe photography mode, and the mode switch (MOS) 23 when selecting the self-timer photography mode. The half-push switch (half-push SW) 24 is turned ON by pushing upon the shutter or release halfway, and the release switch (release SW) 25 is turned ON by fully pushing in the release button.

Lens barrel position detection switch 26 detects the position of the lens barrel. Battery cover switch 27 is turned ON/OFF in conjunction with the opening and closing of the battery cover. Back cover switch 29 is turned ON/OFF in conjunction with the opening and closing of the back cover of the camera which is opened and closed when loading film into the camera body for example.

With regard to switches 21 through 29, as briefly described above, it will be understood that they all operate in the same way with the exception of the lens barrel position detection switch 26 and the back cover switch 29. With the exception of the latter two switches, the other switches are "momentary switches"; that is, when the user's hand or finger is released, the switch automatically returns to its original position.

Turning now to other aspects of the embodiment of FIG. 6, a liquid crystal display 4, a lens barrel drive circuit 5, a photometry circuit 7, a range circuit 8, a feed circuit 9, a date imprint circuit 10, a lens drive circuit 11, a shutter drive circuit 12, a strobe drive circuit 13, a film frame feed detection circuit 14 and an EEPROM 32 are connected to the microcomputer 1.

Liquid crystal display (LCD) 4 is arranged on top of the camera body (main body), and when the photographic mode setting, the date imprint mode setting, etc., are selected, it displays the required information in accordance with the output signals from microcomputer 1. Motor 6 is connected to the lens barrel drive circuit 5 for purposes of driving the lens barrel (not illustrated) which accommodates the photographic lens, and it drives the lens barrel with the required timing according to instructions from microcomputer 1.

Photometry circuit 7 measures the light quantity or ambient light and luminance of the object with the required timing according to instructions from microcomputer 1, and transfers photometric results to microcomputer 1 for processing. The range circuit 8 measures the distance from the camera to the object with the required timing according to instructions from microcomputer 1 and transfers the range finding measurements to microcomputer 1.

The feed circuit 9 winds the film onto a frame, and also rewinds the film into the magazine (not illustrated) according to the instructions from microcomputer 1. The date imprint circuit 10 transcribes the date data in microcomputer 1 onto the surface of the film according to instructions from microcomputer 1.

The lens drive circuit 11 drives a lens (not shown) according to commands from microcomputer 1. The shutter drive circuit 12 drives the shutter (not shown) according to commands from microcomputer 1. The strobe drive circuit 13 drives the strobe (not shown) according to commands from microcomputer 1. The film frame feed detection circuit 14 detects when the film has been fed into 1 frame, or when the rewinding of the film into the magazine has been completed. Data for purposes of determining whether or not the camera possesses a date imprint function has been written into the EEPROM 32 in a conventional manner.

For purposes of power supply, a battery 31 is connected to microcomputer 1, liquid crystal display (LCD) 4, lens barrel drive circuit 5, photometry circuit 7, range circuit 8, feed circuit 9, date imprint circuit 10, lens drive circuit 11, shutter drive circuit 12, strobe drive circuit 13, film frame feed detection circuit 14 and EEPROM 32.

Microcomputer 1 is a one-chip microcomputer with built-in ROM and RAM, and controls all sequences of the camera. It should be noted, however, that the present invention is not limited to a single-chip microcomputer. Moreover, the present invention is suited to accept other microcomputer or microprocessor arrangements as well as other dedicated control circuits and the like. Furthermore, microcomputer 1 also possesses functions which drive the liquid crystal display 4.

Figure 7A:
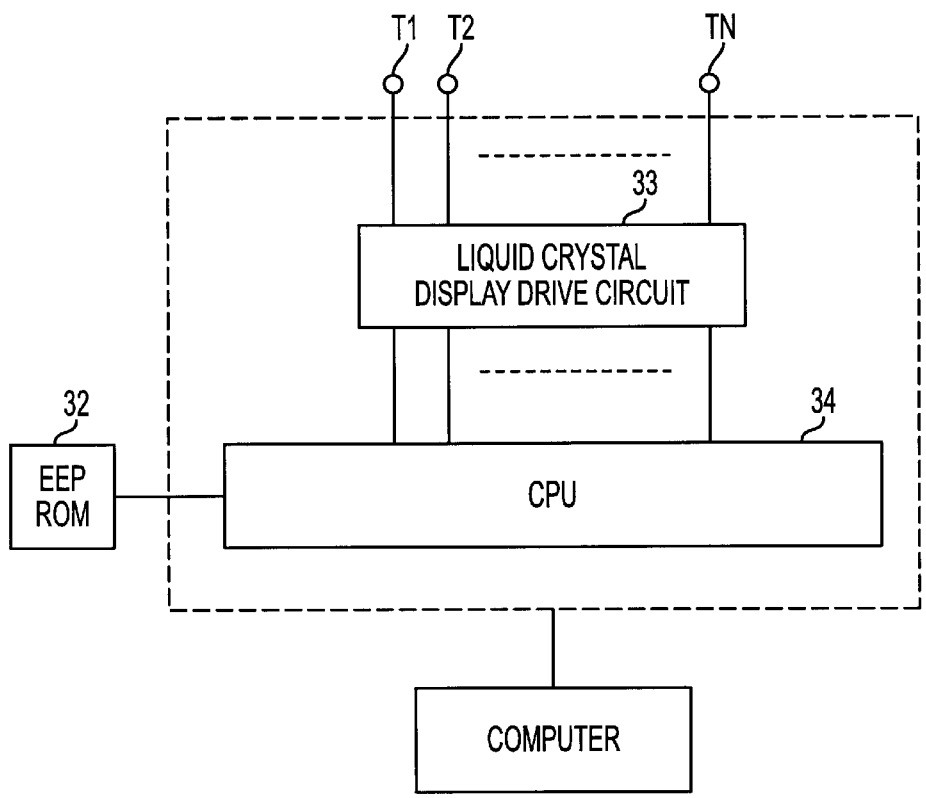
FIGS. 7A–7C are block diagrams which show several important aspects of an embodiment of the present invention.
Figure 7B:
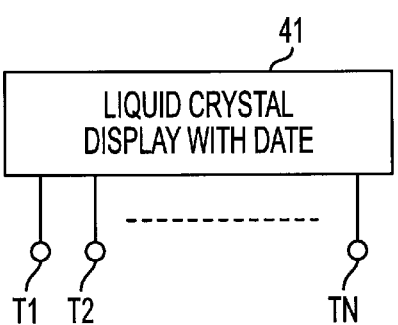
Figure 7C:
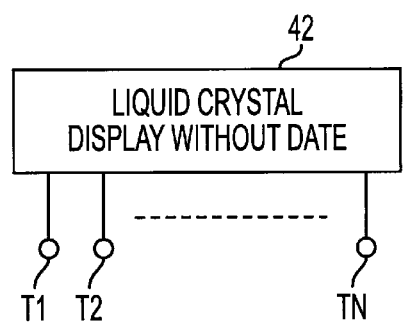

The relation of liquid crystal display 4, microcomputer 1 and the EEPROM 32 are shown in the block diagrams of FIGS. 7A–C. The drive circuit 33 of the liquid crystal display is connected to the liquid crystal display with date 41 (FIG. 7B) and the liquid crystal display without date 42 (FIG. 7C), and drives the liquid crystal display. The liquid crystal drive circuit 33 is controlled by CPU 34.

Figure 21:
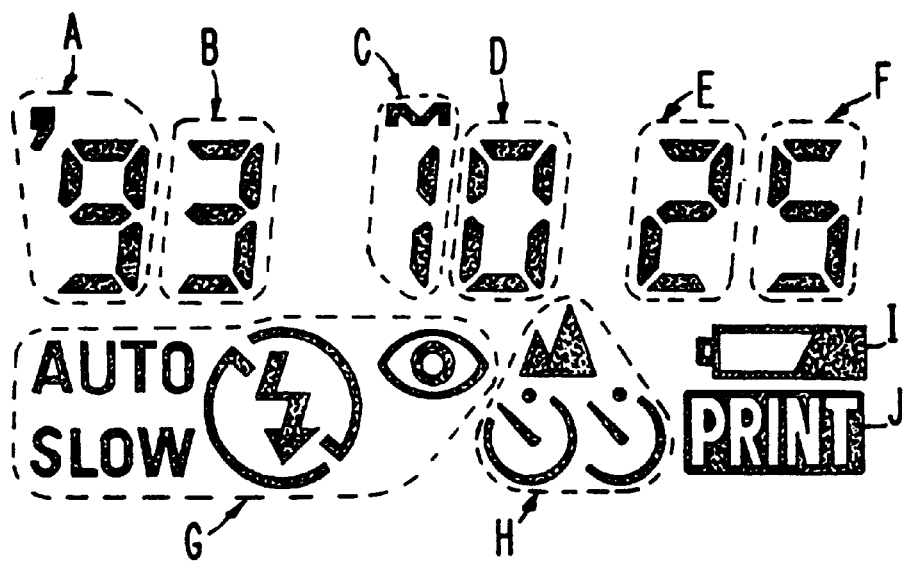
FIG. 21 is a drawing which illustrates the connection of a liquid crystal display and a liquid crystal drive circuit according to an embodiment of the present invention.

In terms of the actual displays provided by the structures of FIGS. 7B and 7C, FIG. 21 shows the liquid crystal display with date 41 (i.e., depicted in FIG. 7B). Reference identifiers A to F indicate the drive parts of number segments, while reference identifiers G to J show the drive parts of the other displays relating to strobe, self-timer, etc. The display drive parts are brought together in the following groups: (A, B), (G), (C, D), (H), (E, F), (I, J). CPU 34 (FIG. 7A) unites the respective groups, and conducts control for each group.

Figure 22:
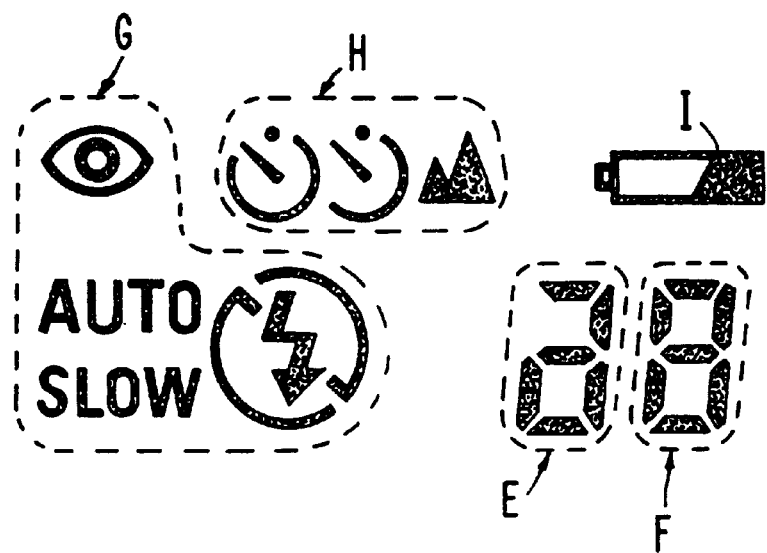
FIG. 22 is a drawing which illustrates the connection of a liquid crystal display device and a liquid crystal drive circuit according to an embodiment of the present invention.

FIG. 22 shows the connection state of liquid crystal display without date 42 (FIG. 7C) and the liquid crystal drive circuit 33. Since the displays relating to the date are unnecessary due to the lack of a date imprint device, among the number segments A to F, the (A, B) and (C, D) parts are not retained, while the part corresponding to (E, F) alone is retained to display the film counter. Relative to the display depicted in FIG. 21, only the (J), (A, B) and (C, D) parts do not exist; otherwise the arrangement of the display drive parts is identical to the LCD with date of FIG. 21, and the contacts for the identical displays have the identical arrangement.

Figure 20:
FIG. 20 is a drawing which shows an example of the display of the liquid crystal display device according to an embodiment of the present invention.
Figure 20:
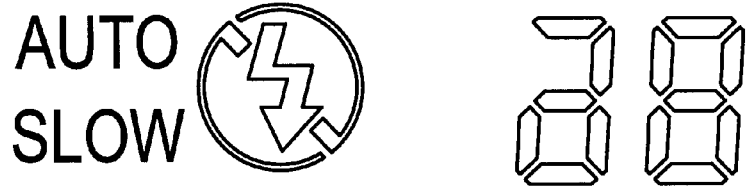

With regard to the types of liquid crystal display 4, there are two types of liquid crystal display 41 which display the date, as shown in FIGS. 16, 17, 18 and 19, and the liquid crystal display 42 which does not display the date, as shown in FIG. 20. As shown in FIGS. 7A–C, the liquid crystal display 41 and liquid crystal display 42 both possess a plurality of contacts for purposes of conducting information transmission with the liquid crystal drive circuit 33. The liquid crystal display 41 and liquid crystal display 42 and liquid crystal drive circuit 33 possess the same plural number of contacts from the T1 contact to the TN contact. The shape of the contacts of liquid crystal display 41 and liquid crystal display 42 are identical, and in both cases, the plurality of contacts connect to the plurality of contacts of the liquid crystal drive circuit 33.

The operations of the present embodiment are explained below. However, there are some prerequisite conditions which should be kept in mind which are as follows.

In the present embodiment, there are five types of strobe modes: automatic light emission, red-eye reduction, light emission inhibition, compulsory light emission, and slow synchronization.

Furthermore, there are five date modes: year-month-day, month-day-year, day-month-year, day-hour-minutes, and OFF. For purposes of setting the date mode, there is a selection mode and a correction mode. In the selection mode, one of the above five date modes is selected. In the correction mode, the time setting of the imprint clock data (year, month, day, hour, minutes) is revised, if necessary or desired.

In the present embodiment, the displays of the date of year-month-day, etc., are simply referred to as a "date display," while the display of the photo frame number of the film is simply referred to as a "counter display."

Figure 8:
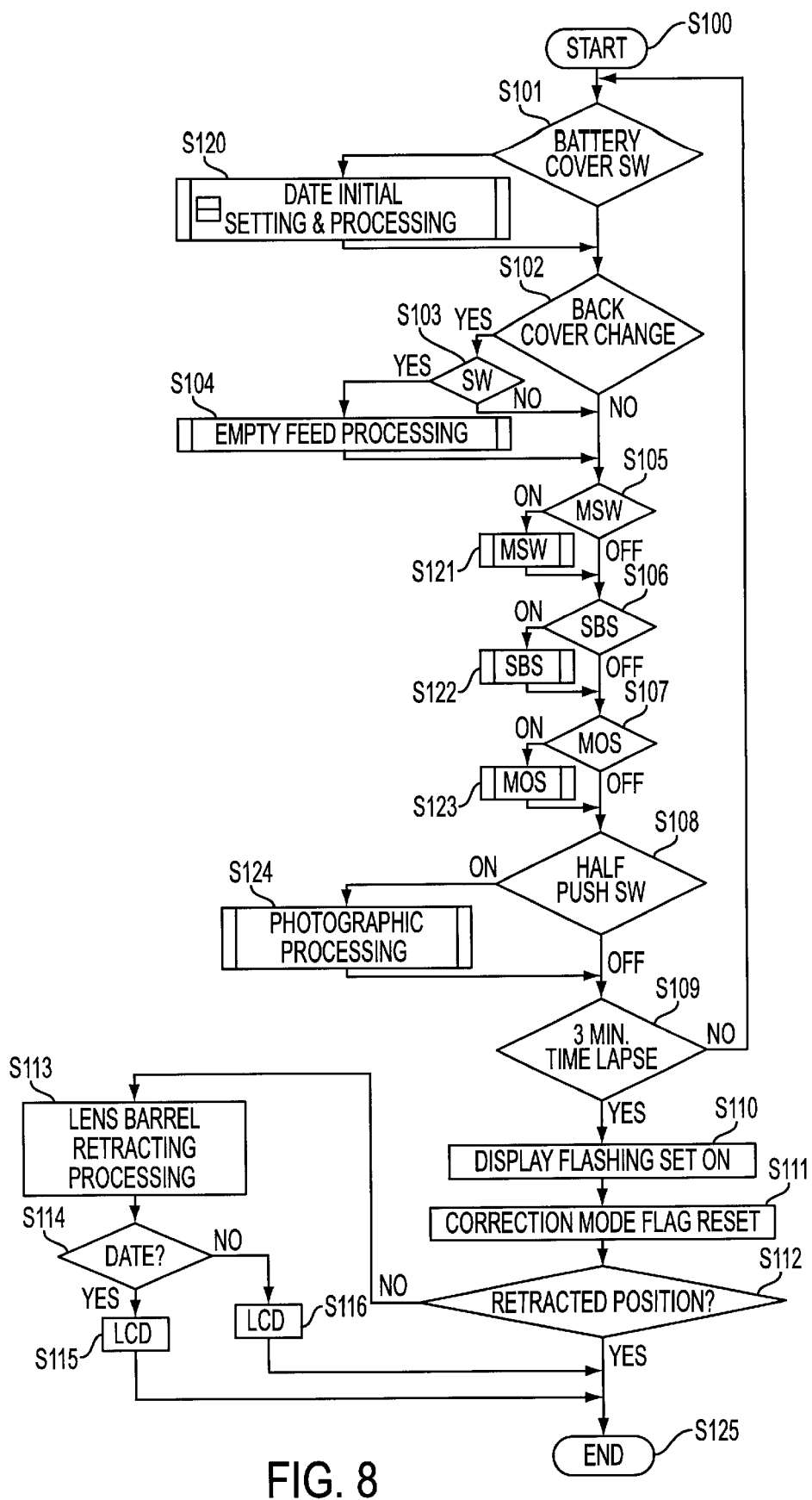
FIG. 8 is a flow chart which illustrates the operations of the embodiment depicted in FIG. 6.

Turning now to the operation of the present embodiment, reference is now made to FIG. 8. Therein depicted is a flow chart designed to explain the overall operations of the embodiment of FIG. 6. In FIG. 8, the symbol "S" expresses the meaning of a "step" in the flow chart or in the program carrying out a particular operation as explained below.

The processing starts from S100. In S101, when the battery is mounted and the battery cover switch is set to ON, there occurs branching to S120, and date initial setting processing is conducted, after which the change of the back cover switch 29 of S102 is checked. The date initial setting processing is described below. In S101, when the state of the battery cover switch 27 does not change, the back cover change check of S102 is conducted.

When the state of the back cover switch 29 changes in S102, it is detected in S103 whether or not the back cover switch 29 has closed. If closed, after conducting empty film feeding in S104, it is detected in S105 whether or not the main switch is ON.

When the back cover switch does not change in S102, and when the back cover switch is not closed in S103, the processing of S105 is immediately conducted to determine whether or not the main switch is ON.

In S105, when it is detected that the main switch (MSW) is ON, there occurs branching to S121, and main switch processing (MSW processing) is conducted.

After completion of main switch processing, or when the main switch 21 is not ON, processing enters loop S106 through S108 which concerns confirmation of switch state as well as 3 minute elapse confirmation which checks the 3 minute power saving timer elapse time of the below-mentioned date correction mode, and where checks are conducted regarding whether any one of the strobe switch 22, mode switch 23 and half-push switch 24 are ON, or whether the 3 minutes have elapsed.

When it is detected in S106 that the strobe switch (SBS) 22 is ON, there occurs branching to S122, and strobe switch processing (SBS processing) is called into execution. When it is detected in S107 that the mode switch (MOS) 23 is ON, there occurs branching to S123, and mode switch processing (MOS processing) is called into execution. When it is detected in S108 that the half-push switch 24 is ON, there occurs branching to S124, and photographic processing is called into execution.

Next, the 3 minute power saving timer elapse time of the date correction mode is checked in S109. If the appropriate time has elapsed, the flashing display is changed to a lighted display in S110, the correction mode flag is reset in S111 and, after withdrawal from the correction mode, the lens barrel state is checked in S112.

When the lens barrel is in a retracted position in S112, lens barrel collapse processing is conducted in S113, and it is checked in S114 whether or not the liquid crystal display which is attached to the camera is a liquid crystal display with date 41. That is, even with the same type of camera, since the professional-use cameras derive their value from the image content of the photograph and are seldom used for purposes of mementos, not only is the date imprint function unnecessary, but it also often happens that the quality of the photographic content is reduced when the transcription of the date occurs due to operational mistake. On the other hand, since amateur-use cameras are mainly used for documentary photographs which possess meaning as mementos, date imprint is popular in application, and growing in commercial value.

The date imprint function can be added as a separate option, but it then becomes necessary to attach the optional part to the exterior of the camera, which leads to an increase in display size. Moreover, since it is necessary to purchase the optional part, the user must bear its cost.

In the present embodiment, the date is not displayed on an optional part. Instead, the camera has been pre-designed to enable the display of both the date and the photo frame number on the liquid crystal display with date 41 by means of display changeover. Or, for cameras which do not possess a date imprint function, the liquid crystal display without date 42 is prepared. The data and programming required to display the date on this liquid crystal display with date 41 are written into the EEPROM 32. Since there is no need to display the date on the liquid crystal display without date 42, the appropriate data and programming are written into the EEPROM 32.

Alternatively, a discrimination signal can be written into the EEPROM 32 for determining whether or not the required data (the date) is to be displayed on the liquid crystal display 41, and the CPU seeks out the data signal inside EEPROM to determine whether or not date display is to be conducted. Since the data inside EEPROM can be rewritten at any time from the outside, processing can be arranged to cause an immediate selection of which display is to be made (i.e., with or without date data).

Accordingly, cameras possessing a date imprint function and cameras not possessing a date imprint function can incorporate the same electrical structure with the exception of the programming and/or logic which is maintained in EEPROM 32. If done in this way, since the parts except for the EEPROM 32 can be used in common, there is little extra cost, and since all processing can be done internally, there is no increase in size of the LCD display device.

Turning back to a description of the processing of the embodiment of the present invention, it will be noticed that in S114, it is checked whether or not the liquid crystal display of the camera possesses a date display function. If there is a liquid crystal display with date (e.g., as with display 41), the LCD display changeover counter is switched to the date in S115, and if there is not a liquid crystal display with date 41, the LCD is extinguished in S116.

Next, the processing of each subroutine in the flow chart of FIG. 8 is explained.

Figure 9:
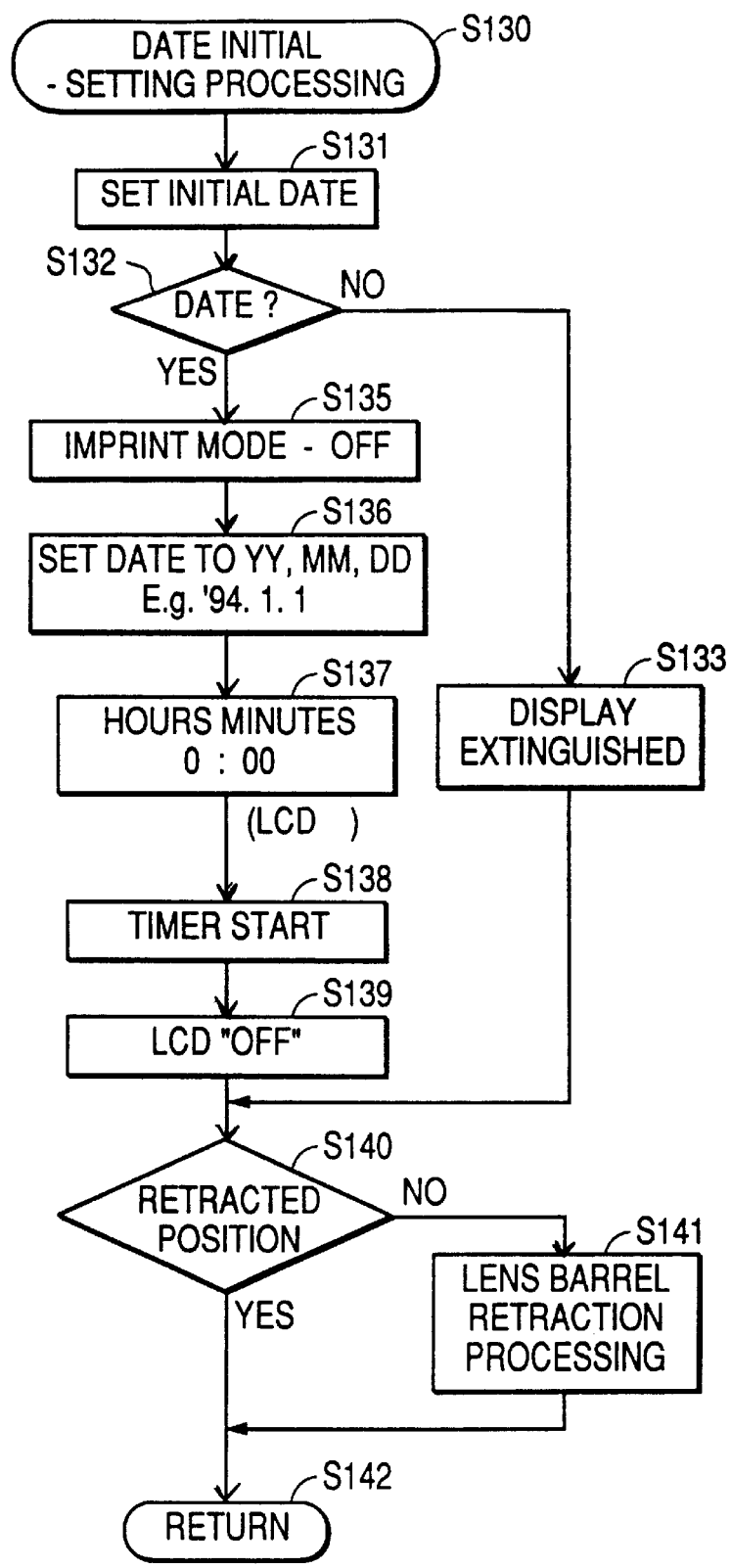
FIG. 9 is a flow chart which illustrates the operations carried out by a subroutine depicted at S120 in FIG. 8.

Referring now to FIG. 9, therein depicted is a flow chart which shows the date initial setting processing of S120 in the flow chart of FIG. 8. When the change of the battery cover switch 27 is confirmed in S101 of FIG. 8, processing advances to S120, and date initial setting processing is called into execution.

The date initial setting processing starts from S130 of FIG. 9. In S131, processing of the data initial setting which performs initial setting of the timer and flag is conducted. In S132, a check is made to determine whether or not there is a liquid crystal display with date capability 41 by means of the data inside the EEPROM 32 of FIG. 6. If there is no liquid crystal display with date 41, the liquid crystal display 4 is erased in S133. If there is a liquid crystal display with date 41, the imprint mode is turned OFF in S135.

Next, initial setting of the date calendar to a specific year-month-day (in this case, 94-01-01) is conducted in S136, initial setting of the time to a specific time (in this case, 0:00) is conducted in S137, and timing is commenced in S138.

The liquid crystal display 4 is set to an OFF display in S139. In S140, it is checked whether or not the lens barrel is in a retracted position. If not in a retracted position, after conducting lens barrel insertion processing, i.e., collapse processing, in S141, a return to the processing of FIG. 8 occurs by the return of S142; if already in a retracted position in S140, a return to the processing of FIG. 8 immediately occurs.

Figure 10:
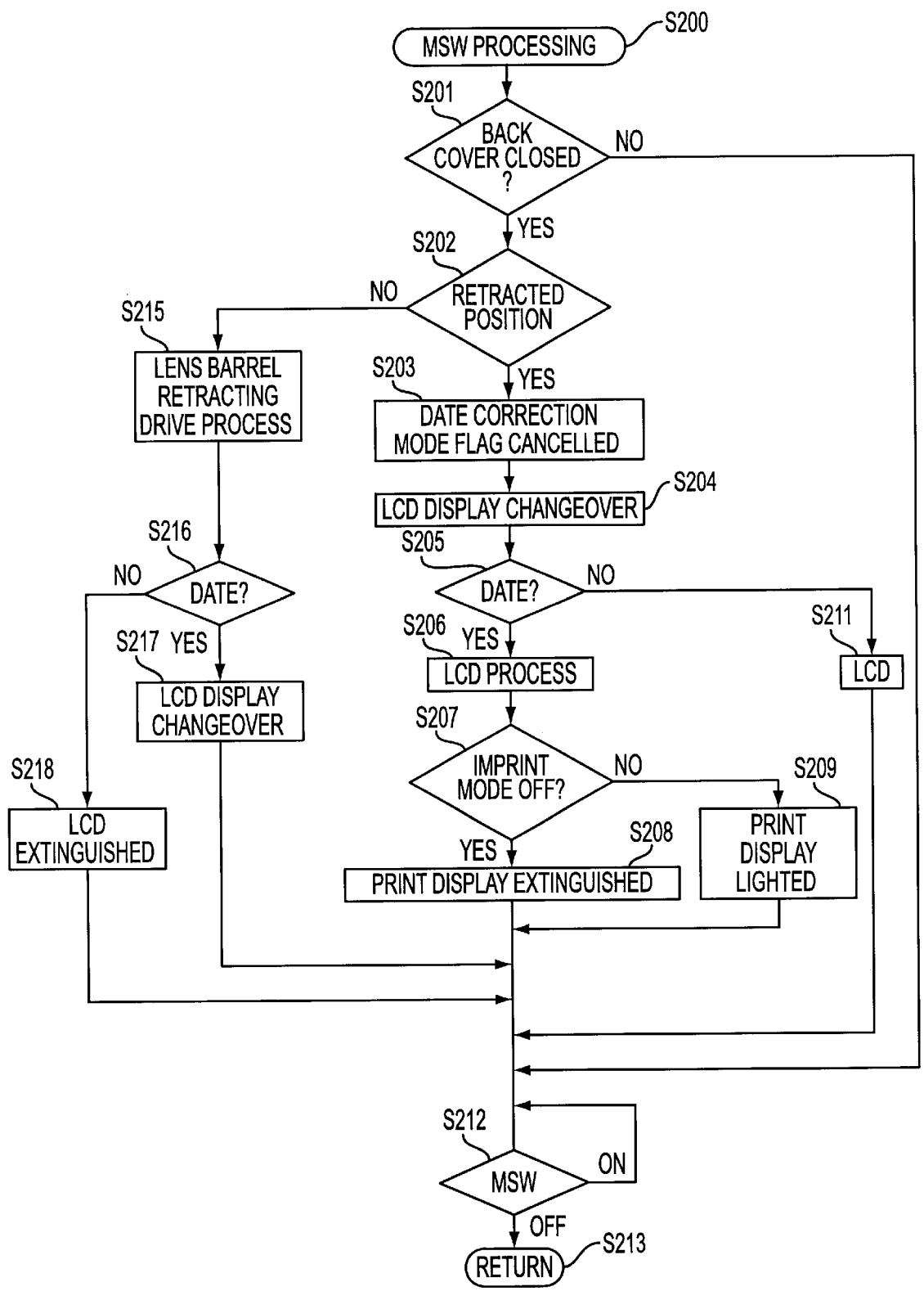
FIG. 10 is a flow chart which illustrates the operations carried out by a subroutine depicted at S121 in FIG. 8.

Referring now to FIG. 10, therein depicted is a flow chart which shows the main switch processing (MSW processing) of S121 in the flow chart of FIG. 8.

When it is confirmed that the main switch (MSW) 21 is ON in S105 of FIG. 8, processing advances to S121, and the main switch processing shown in FIG. 10 is called into execution.

Main switch processing starts at S200. In S201, a check is made to determine whether the back cover is closed or not by the state of the back cover switch 29. When it is determined that the back cover is closed, the state of the lens barrel position detection switch 26 is detected in S202, and it is determined whether or not the lens barrel is in a retracted position.

When the lens barrel is in a retracted position, processing advances to S203 where the date correction mode flag is eliminated or reset. In S204, microcomputer 1 drives the motor 6 via the lens barrel drive circuit 5, and after the lens barrel has been extended to the photo-taking position, it is checked in S205 whether or not there is a liquid crystal display with date capability 41.

Figure 17:
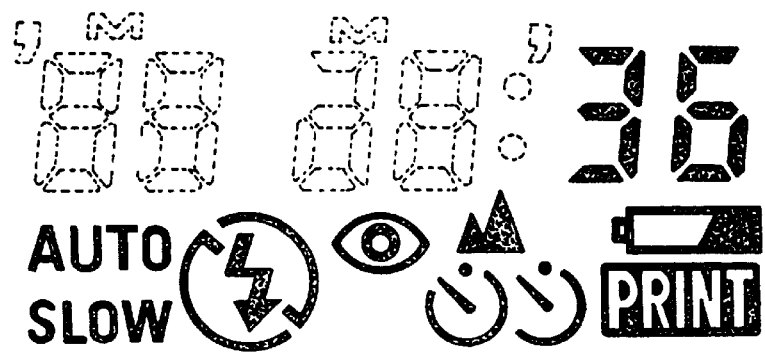
FIG. 17 is a drawing which shows an example of photographic frame number display in a liquid crystal display device according to an embodiment of the present invention.

Here, if there is no liquid crystal display with date capability 41, the liquid crystal display 4 is extinguished in S211, and a shift occurs to the processing of S212 which determines the state of the main switch; if there is a liquid crystal display with date 41, in S206 the photographic mode is displayed on the liquid crystal display 4 (see FIG. 17). In S207, it is confirmed whether or not the date imprint mode is OFF or not. If OFF, the PRINT mark of the liquid crystal display 4 is extinguished in S208. If ON, after lighting the PRINT mark in S209 (FIG. 17), a shift occurs to the processing of S212 which determines the state of the main switch.

When it is determined that the lens barrel is not in a retracted position in S202, the motor 6 is driven by the lens barrel drive circuit 5 in S215, and the lens barrel is brought to a retracted position. When it is determined that there is a liquid crystal display with date 41 in S216, the date imprint data is displayed on the liquid crystal display 4 in S217 (in FIGS. 16 and 18, the date of 94(year)-10(month)-25(day) is displayed). Thereafter, a shift occurs to the processing of S212 which determines the state of the main switch processing.

If it is determined that there is no liquid crystal display with date 41 in S216, a shift occurs to the processing of S212 which determines the state of the main switch via the LCD extinguish processing of S218. In the main switch processing of S212, processing waits until the main switch 21 is turned OFF, and when main switch 21 is OFF, processing returns from S213 to processing depicted in the flow chart of FIG. 8.

Figure 11:
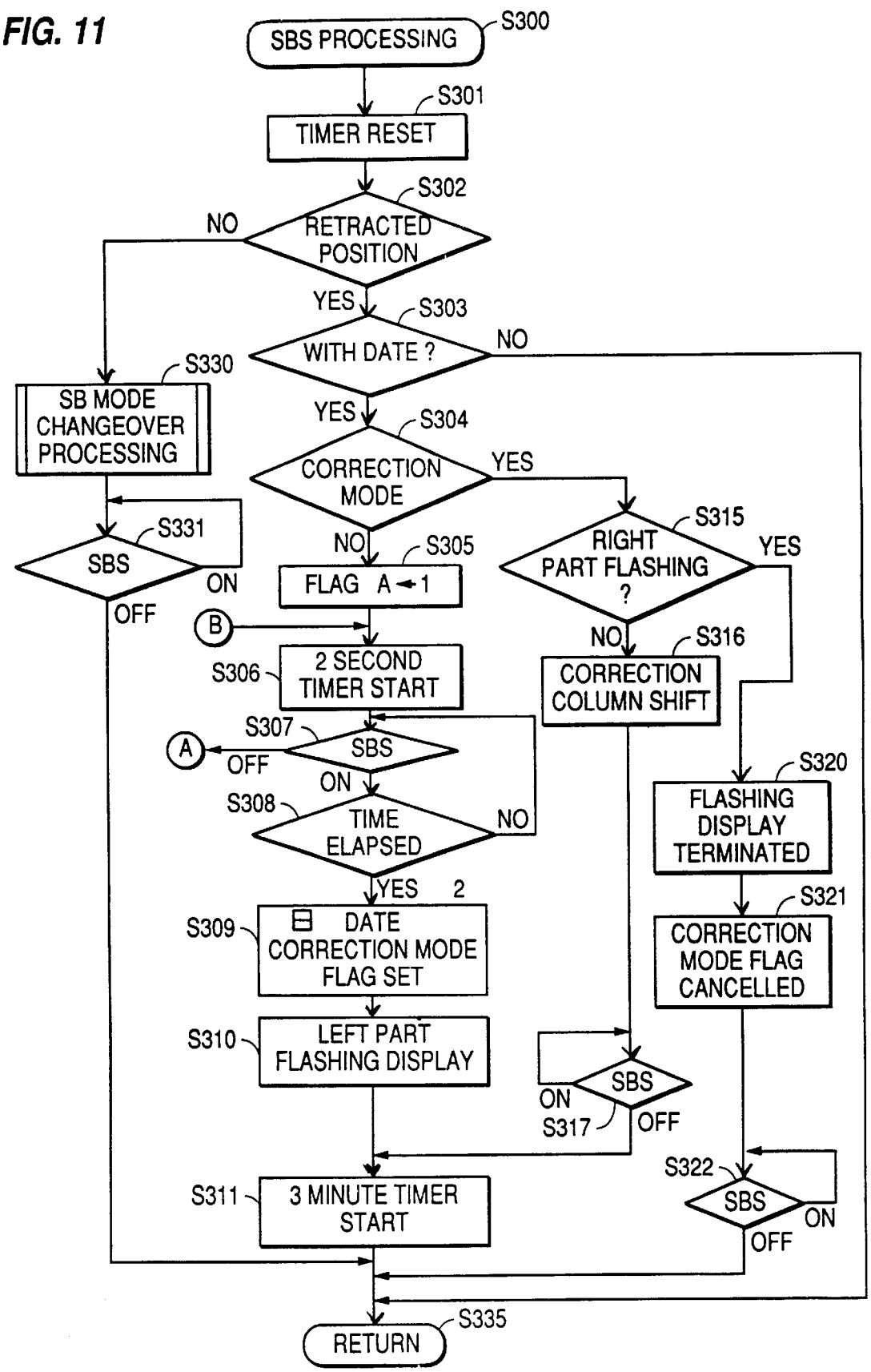
FIG. 11 is a flow chart which illustrates the operations carried out by a subroutine depicted at S122 in FIG. 8.

Referring now to FIG. 11, therein depicted is a flow chart which shows the strobe switch (SBS) processing of S122 depicted in the flow chart of FIG. 8.

When it is confirmed that the strobe switch (SBS) 22 is ON in S106 of FIG. 8, processing advances to S122, and the strobe switch processing (SBS processing) shown in FIG. 11 is called into execution.

Strobe switch processing starts at S300. First, the timer is reset in S301, the state of the lens barrel position detection switch 26 is detected in S302, and it is determined whether the lens barrel is in a retracted position or not.

Figure 23:
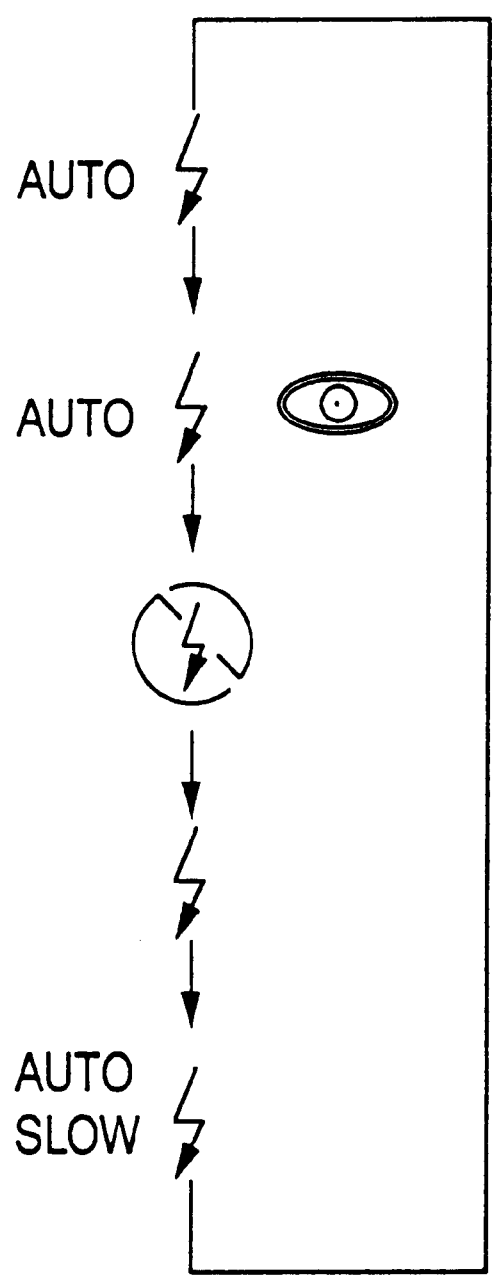
FIG. 23 is a drawing which illustrates a display example of strobe mode changeover in the liquid crystal display device depicted in FIG. 6.

When the lens barrel is in a retracted position, processing advances to S330, and a changeover of the SB mode (strobe mode) occurs. There are five types of SB modes: automatic light emission mode, red-eye reduction mode, light emission inhibition mode, compulsory light emission mode, and slow synchronization. Changeover is respectively conducted to the red-eye reduction mode when in the automatic light emission mode, to the light emission inhibition mode when in the red-eye reduction mode, to the compulsory light emission mode when in the light emission inhibition mode, to slow synchronization when in the compulsory light emission mode and to the automatic light emission mode when in slow synchronization mode (see FIG. 23). Thereafter, a shift occurs to S331, where processing waits until the strobe switch 22 is turned OFF. When the strobe switch 22 is OFF, there occurs a return to processing depicted in the flow chart of FIG. 8 from S335.

When it is recognized that the lens barrel is in the retracted position in S302, and that there is a liquid crystal display with date 41 in S303, processing advances to S304 where it is confirmed whether the date correction mode has already been entered or not. If the date correction mode has not been entered, this signifies that the user is, in actuality, in the selection mode. At this time, processing advances to S305, flag A is raised (set to "1"), and it is made possible to distinguish the first time push operation of the strobe switch 22.

The 2 second timer (which is built into and clocked by microcomputer 1) is started in S306, and it is confirmed in S307 whether or not the ON of the strobe switch 22 is continuing. That is, after the 2 second timer start, it is determined in S307 whether or not the strobe switch 22 is OFF. If OFF, processing advances to S350. If the ON condition is continuing, it is determined in S308 if the time has elapsed or not. If the time has not yet elapsed, there occurs a return to the loop of S307, S308.

When the timer has undergone a time elapse (when the strobe switch 22 has been ON for more than 2 seconds) in S308, the flag of the correction mode is set (this flag indicates the point when processing later advances again to S304) in S309. In the interval while the flag of the correction mode is being set, the date correction mode is entered.

Thereafter, processing advances to S310, and the left part of the liquid crystal display 4 is set to a flashing display (as mentioned below, the flashing display is subject to design choice). Thereafter, the 3 minute timer is started in S311, and there occurs a return to the processing depicted in the flow chart of FIG. 8 from S335. When there is no input of the mode switch 23 and the strobe switch 22 for 3 minutes, the time elapses (S109).

Figure 16:
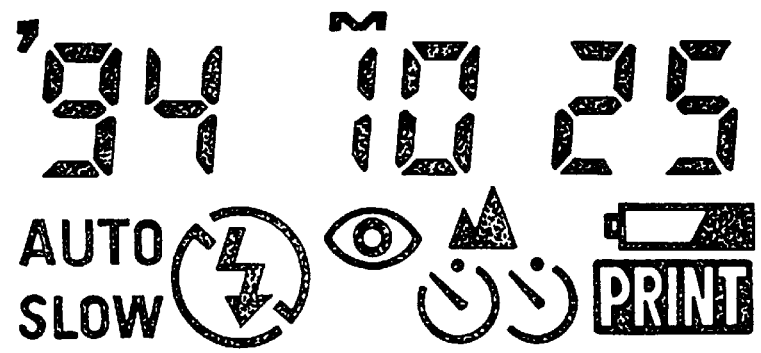
FIG. 16 is a drawing which shows an example of date display in a liquid crystal display device according to an embodiment of the present invention.
Figure 18:
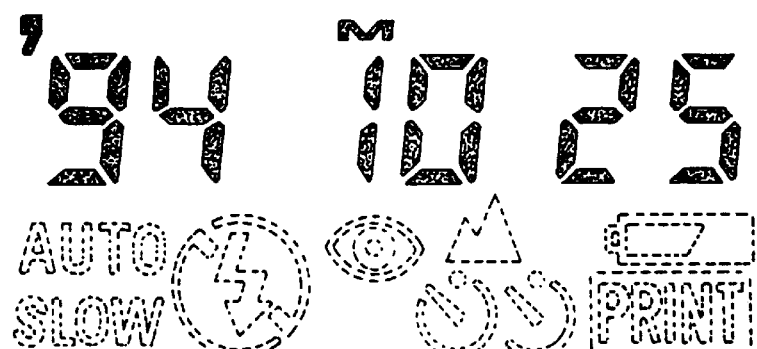
FIG. 18 is a drawing which shows an example of a date correction display in a liquid crystal display device according to an embodiment of the present invention.
Figure 19:
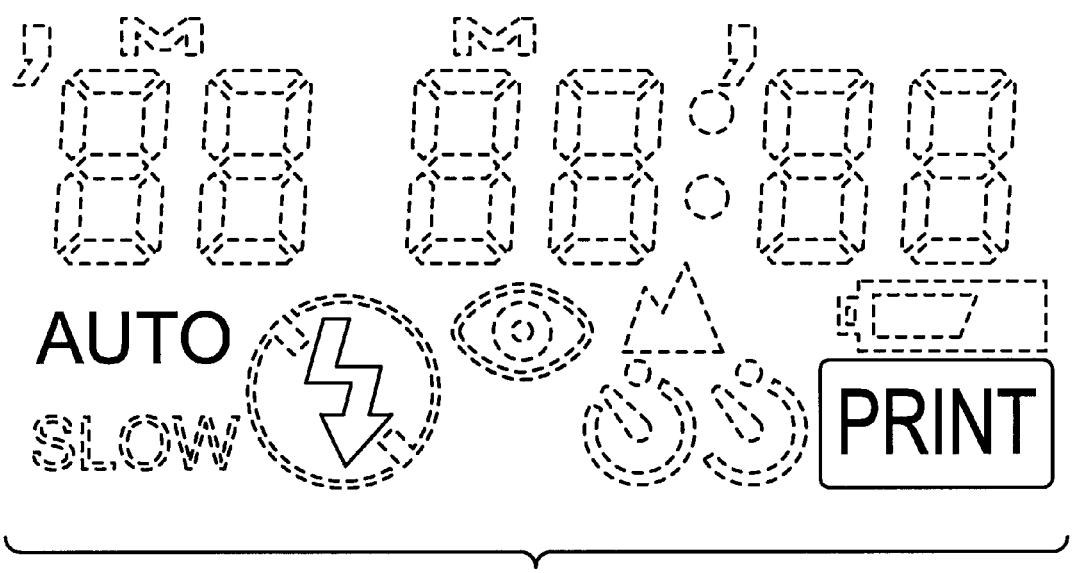
FIG. 19 is a drawing which shows an example of a film rewinding completion display in a liquid crystal display device according to an embodiment of the present invention.

The date display of the liquid crystal display 4 is displayed in three blocks consisting of a left part, a middle part and a right part, and each block can conduct display in two columns with ten different numbers (see FIGS. 16 and 18). Correction is conducted in the order of left part, middle part, and right part. When the correction mode has been entered, first, the left part flashes, showing that the correction of the left part is possible. For example, when the selection mode is "year-month-day," the display shows "year" in the left part, "month" in the middle part, and "day" in the right part. When the correction mode has been entered, first, the "year" of the left part (in the case of FIGS. 16 and 18, the "'94") flashes, showing that the correction of the year is possible.

When it has been determined in S304 that the correction mode has already been entered, processing advances to S315. In S315, it is confirmed whether or not the right part (the "25" of FIGS. 16 and 18) is flashing. If the right part is flashing, this signifies that all corrections have already been completed; the flashing display of the liquid crystal display 4 is then terminated in S320, and the correction mode flag is eliminated in S321. In this fashion, the correction mode is exited. Thereafter, the OFF of the strobe switch 22 is set to wait in S322, and when the strobe switch 22 is OFF, there occurs a return to the processing depicted in the flow chart of FIG. 8 from S335.

If the right part is not flashing in S315, a shift of the correction column (flashing position) occurs. Changeover is respectively made to the middle part (the "M10" in FIGS. 16 and 18) if the left part (the "'94" of FIGS. 16 and 18) is flashing, and to the right part (the "25" of FIGS. 16 and 18) if the middle part is flashing. Thereafter, the OFF of the strobe switch 22 is set to wait in S317, and when the strobe switch 22 is OFF, the 3 minute timer is started in S311, and a return occurs to the processing depicted in the flow chart of FIG. 8 from S335.

Figure 12:
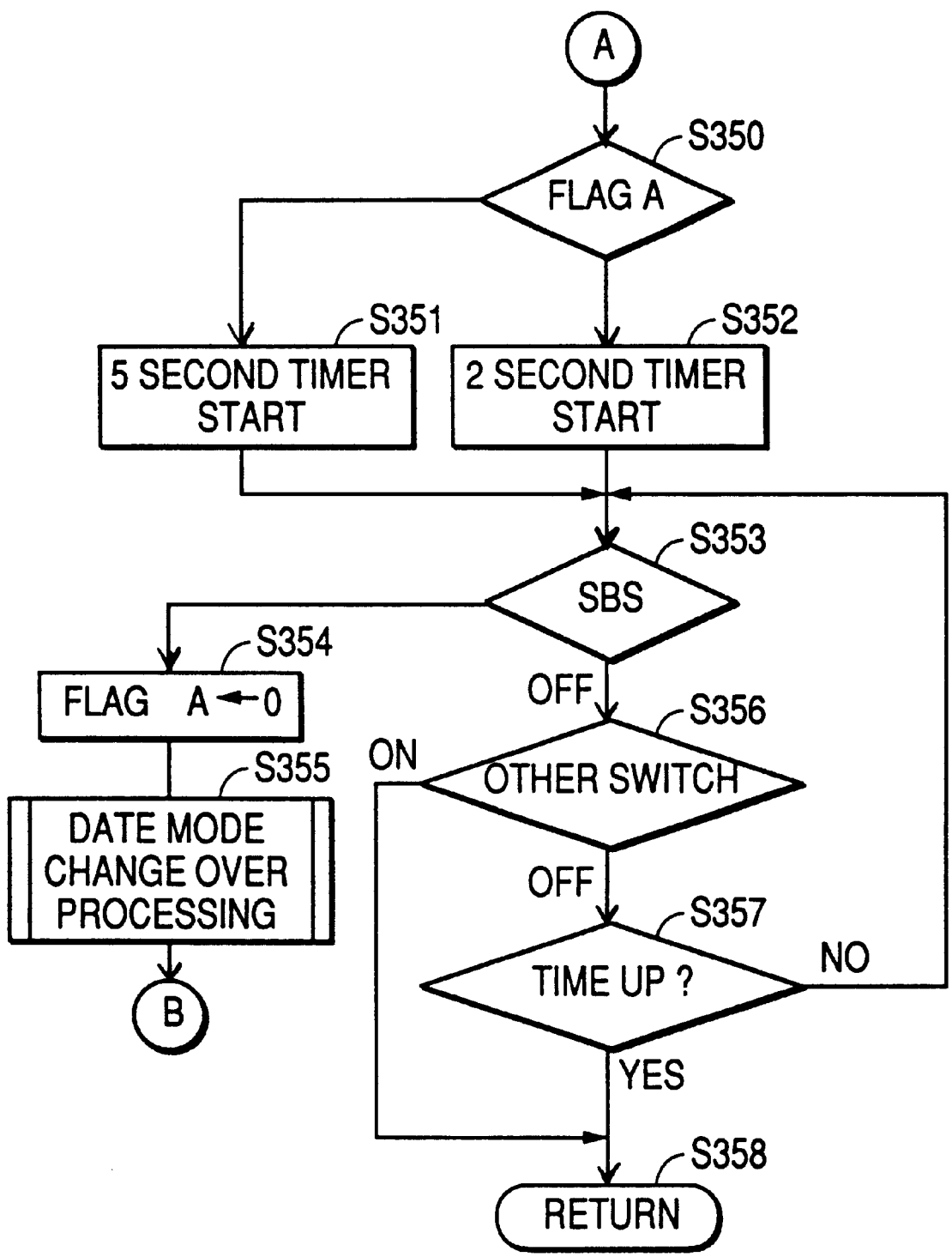
FIG. 12 is a flow chart which is a continuation of the flow chart depicted in FIG. 11.

When the strobe switch is turned OFF in S307 (when it has turned OFF prior to the elapse of the 2 second interval, after the strobe switch 22 had been turned ON one time), processing advances to S350 of the flow chart shown in FIG. 12 where it is determined whether the flag A is "0" or "1." If "0" (when the strobe switch 22 is turned ON again during the 2 second interval, flag A is reset to "0" in the below-mentioned S354, the 5 second timer is started in S351, and processing enters the loop of S353, S356 and S357, where the ON of the strobe switch 22 is set to wait.

In the case where flag A is "1" (the case where the strobe switch 22 has been ON/OFF only once) in S350, the 2 second timer is started in S352, and processing enters the loop of S353, S356, S357 where processing awaits the next ON of the strobe switch 22.

In the loop of S353, S356, S357, when the strobe switch 22 is turned ON again within 5 seconds or 2 seconds, processing advances to S354 where the flag A is set to "0," and in S355 the date mode changeover processing is conducted.

Figure 24:
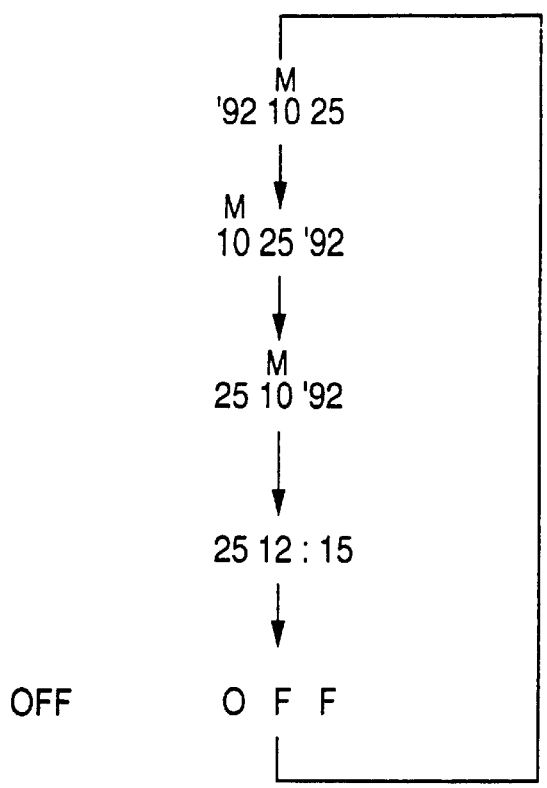
FIG. 24 is a drawing which illustrates a date mode changeover display example in the liquid crystal display device depicted in FIG. 6.

The date mode has the five modes of year-month-day, month-day-year, day-month-year, day-hour-minutes, and OFF. Changeover is respectively conducted to "month-day-year" when in "year-month-day," to "day-month-year" when in "month-day-year," to "day-hour-minutes" when in "day-month-year," and to "OFF" when in "day-hour-minutes" (see FIG. 24). Thereafter, processing returns to S306 where the 2 second timer is started (the timer for determining whether or not processing enters the correction mode). Processing then advances to S307, where it returns to the operations of S307 mentioned above.

With regard to the loop of S353, S356, S357, in the case where any of the other switches (the main switch 21, etc.) is ON in S356, processing returns to the flow chart depicted in FIG. 8 from S358. In S357, when the strobe switch 22 is not pushed and the 5 second (S351) or 2 second (S352) timer has elapsed, processing returns to the flow chart of FIG. 8 from S358.

The reason for making the timer count time for at least 5 seconds in S351 in contrast to making it short at 2 seconds in S353 is as follows. When flag A is "1" (when the strobe switch 22 has still been ON only once), it is determined whether or not the user possesses the inclination to conduct mode changeover based on whether the strobe switch 22 (or another switch) is turned ON one more time (if the mode changeover were conducted by a one-time switch manipulation, when manipulation was done inadvertently, there would be an immediate mode changeover; in order to prevent this, mode changeover is made to require a two-time manipulation during a 2 second interval), and it is not necessary to have a long time in order to confirm this inclination. Thus, a short period of 2 seconds is set in S352. In contrast, when flag A is "0," this is the time of changeover of the date mode, and it is necessary to give the user a longer time for consideration. Thus, a longer time of 5 seconds is set in S351.

Figure 13:
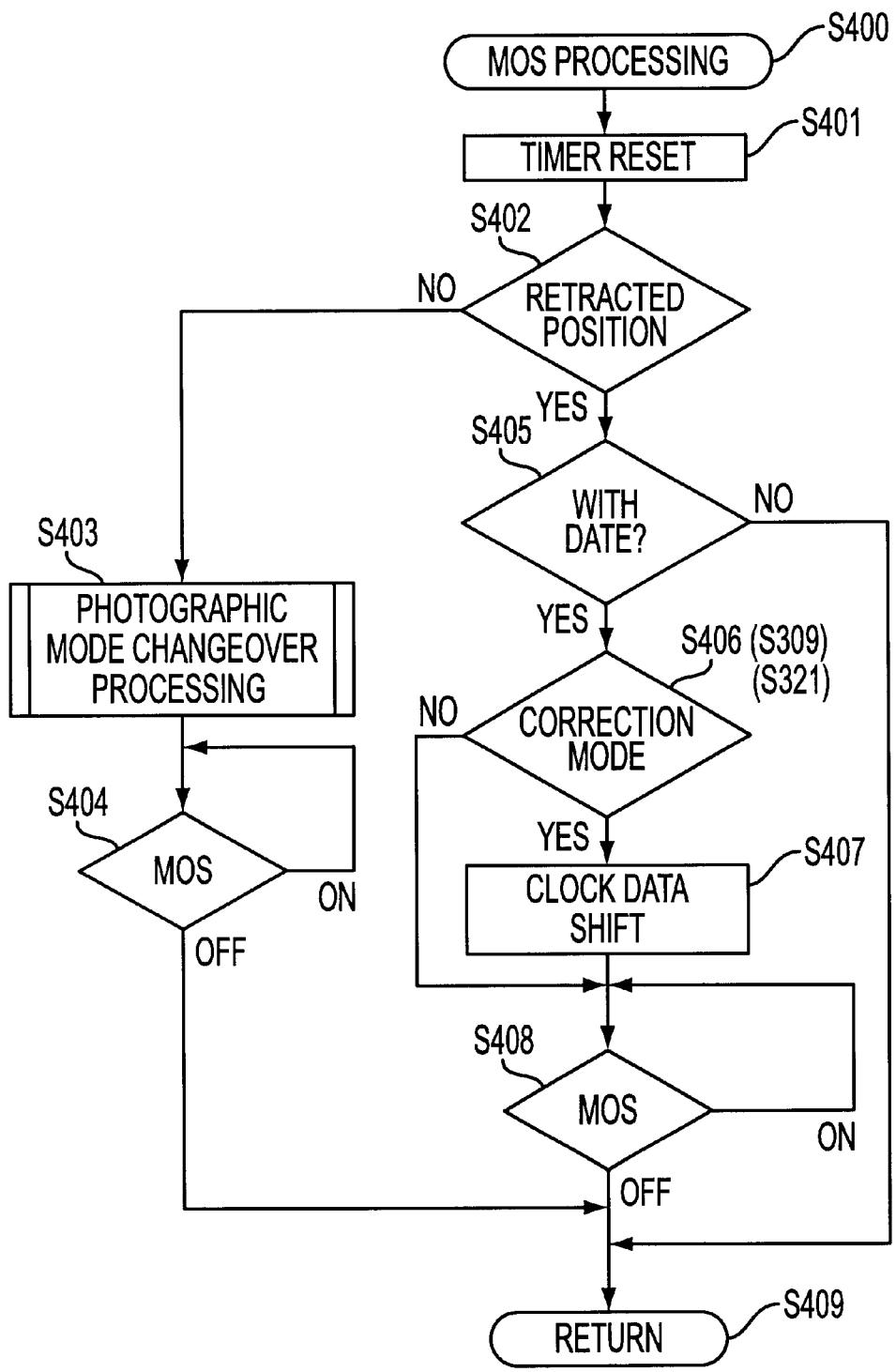
FIG. 13 is a flow chart which illustrates the operations carried out by a subroutine depicted at S123 in FIG. 8.

Referring now to FIG. 13, therein depicted is a flow chart which shows the mode switch processing (MOS processing) of S123 in the flow chart of FIG. 8.

When it is confirmed in S107 of FIG. 8 that the mode switch (MOS) 23 is ON, processing advances to S123, where the mode switch processing shown in FIG. 13 is called into execution.

Mode switch processing starts at S400. First, the 3 minute timer (which is started in S311) is reset in S401. The state of the lens barrel position detection switch 26 is read in S402, and it is confirmed whether or not the lens barrel is in the retracted position. When the lens barrel is not in the retracted position, processing advances to S403 where changeover to the photographic mode is conducted.

Figure 25:
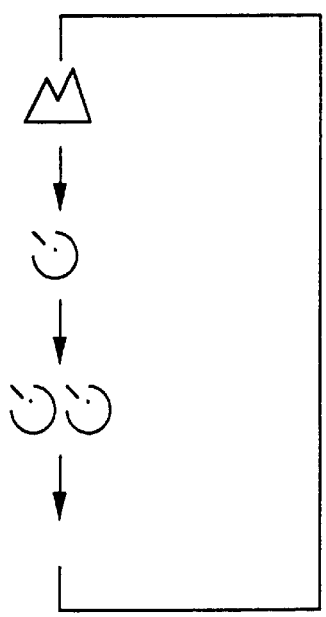
FIG. 25 is a drawing which illustrates a photographic mode changeover display in the liquid crystal display device depicted in FIG. 6.

In the photographic mode, there are the four types of normal photographic (release) modes, forced 1 mode, single self mode, and double self mode; changeover occurs in turn by the ON of the mode switch 23 (see FIG. 25).

In the forced 1 mode, when the release button is fully pushed in, the focusing lens is reset to 1 and the shutter operates (opens). In the single self mode, when a fixed time has elapsed after fully pushing in the release button, the shutter operates. In the double self mode, self timer photography is conducted two times. In the normal photographic mode, ordinary photography is conducted.

Thereafter, processing advances from S403 to S404, where processing awaits the OFF state of the mode switch 23. When the mode switch 23 is turned OFF, processing returns to the flow chart of FIG. 8 from S409.

When it is determined in S402 that the lens barrel is in the retracted position, it is checked in S405 whether or not there is a liquid crystal display with date capability 41. If there is a liquid crystal display with date 41, it is confirmed in S406 whether or not processing has already entered the correction mode (in the retracted condition, when the strobe switch 22 is ON for more than 2 seconds, the correction mode is set in S309 of FIG. 11; the correction mode is canceled in S321 after termination of the correction of the right part). If the correction mode has not been entered, processing advances to S408 and awaits the OFF condition of the mode switch 23. When the mode switch 23 is turned OFF, processing returns to the flow chart of FIG. 8 from S409.

When the correction mode has been entered in S407, the clock data is shifted in S407. Among the left part, middle part and right part, 1 (or −1) is added to the data (year, month, day, hour or minutes) of the block which is flashing at that time. For example, when the display mode is year-month-day and the "year" of left part is set to '93 and is flashing, the "93" of the year is switched to "94" and flashing display is conducted. Thereafter, it is confirmed in S408 that the mode switch 23 is OFF, and processing returns to the flow chart of FIG. 8 from S409.

Figure 14:
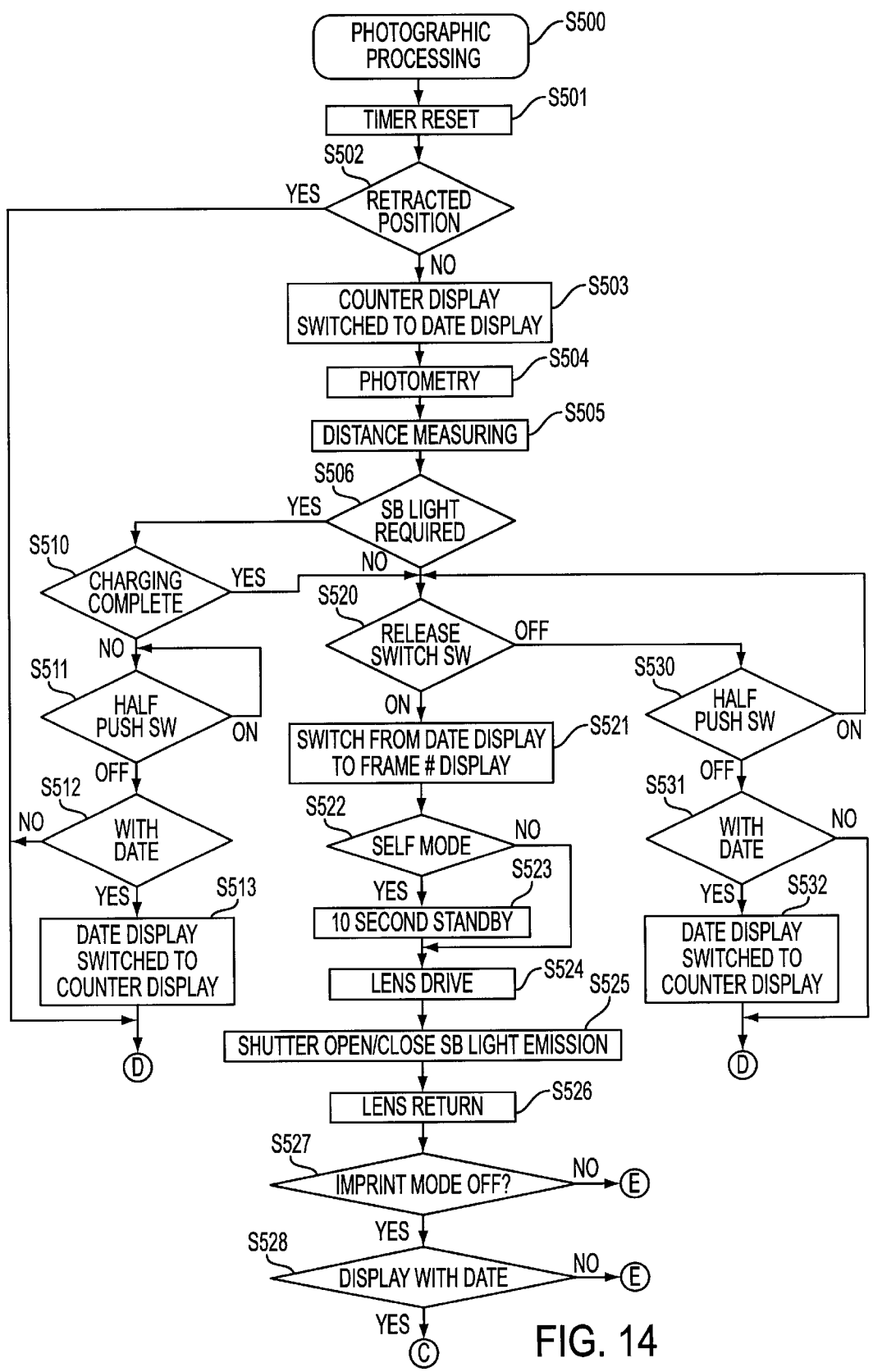
FIG. 14 is a flow chart which illustrates the operations carried out by a subroutine depicted at S124 in FIG. 8.
Figure 15:
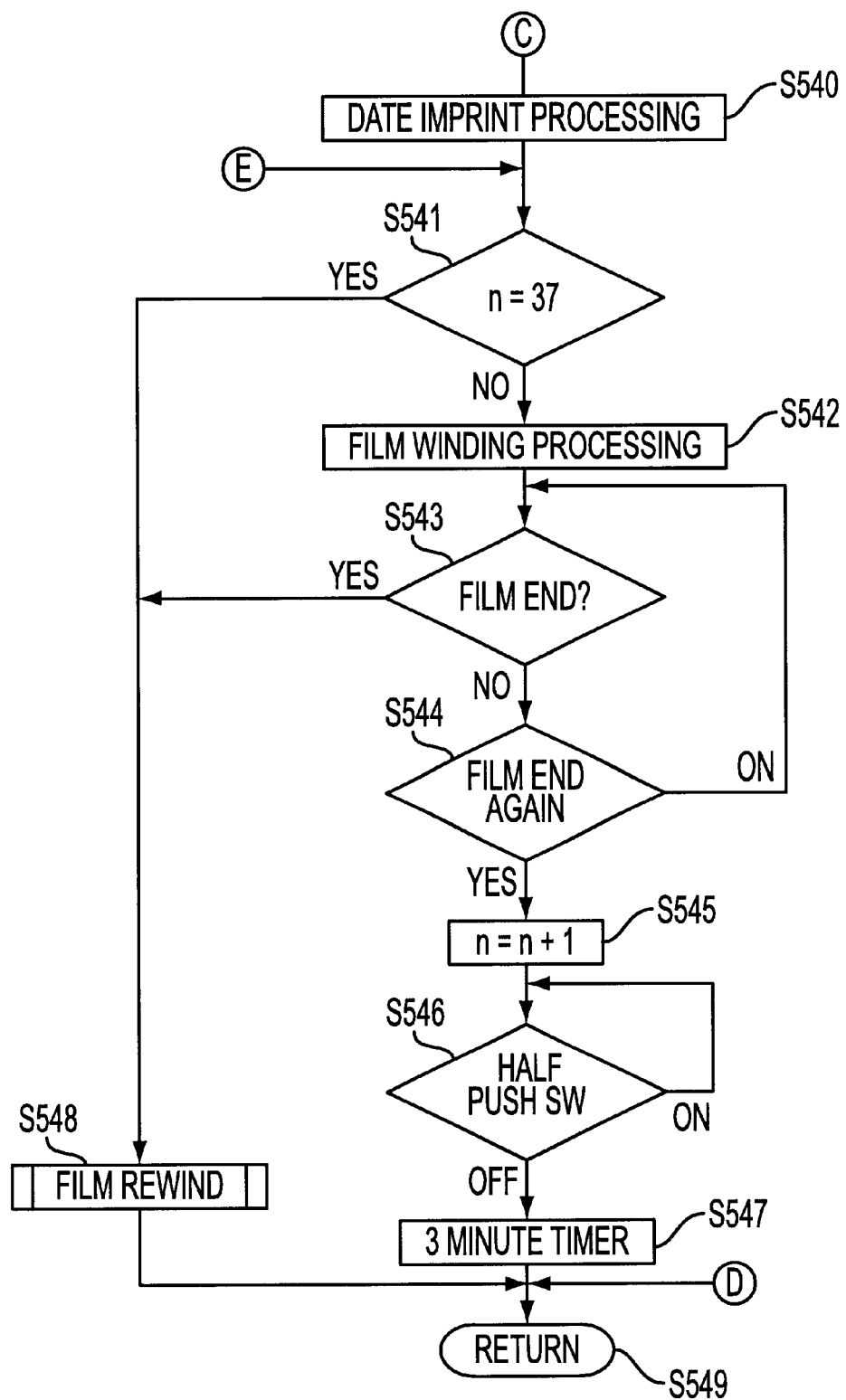
FIG. 15 is a flow chart which is a continuation of the flow chart depicted in FIG. 14.

Attention is now directed to the details of the subroutine of the photographic processing of S124 of FIG. 8. More particularly, such photographic processing is explained with reference to the flow charts of FIGS. 14 and 15. Processing commences from S500. The 3 minute timer is reset in S501, and in S502 it is determined whether or not the lens barrel which accommodates the photographic lens is in the retracted position. When the lens barrel is in the retracted position, the lens barrel position detection switch 26 is ON. During this time, photography is impossible. Accordingly, processing advances to S549 where photographic processing is terminated, and then returns to the flow chart of FIG. 8.

In the case where it is determined in S502 that the lens barrel position detection switch 26 is OFF (the case where the lens is in an extended position), processing advances to S503 where a changeover is conducted in the display of the liquid crystal display 4 from the state where the photo frame number 36 is displayed as shown in FIG. 17 to the state where the date ('94-10-25) is displayed as shown in FIG. 16. Thus, by using the identical display part for data display and date display, part of the functions of both can be used in common, and even if both functions are provided, an increase in size can be prevented and the cost increase kept extremely small.

Processing next advances to S504 where photometry processing is performed. That is, microcomputer 1 controls the photometry circuit 7 so that photometry processing is executed. At this time, the photometry circuit 7 calculates the luminance of the object from the quantity of light input in the built-in light reception element, and computes the opening time of the shutter (not illustrated).

Simultaneously, it is determined whether or not there is low luminance, and it is determined whether or not strobe light emission is required. In the case where the automatic light emission mode has been set, it is determined whether or not the strobe is to emit light according to the luminance. In the case where the light emission inhibition mode has been set, the light emission of the strobe is inhibited regardless of the luminance. In the case where the compulsory light emission mode has been set, the strobe emits light regardless of the luminance.

Processing next advances to S505 where range processing is performed. At this time, microcomputer 1 controls the range circuit 8 so that range processing is executed. The range results are transmitted from the range circuit 8 to the microcomputer 1. When strobe light emission is required in S506, it is determined whether or not this was decided in S504. In the case where it was decided that strobe light emission is necessary, processing advances to S510 where it is determined whether or not the charging of the strobe has been completed. If the charging has not been completed, strobe light emission cannot be conducted. Consequently, processing advances to S511 where a standby ensues until the half-push switch 24 is turned OFF (until the release button is released), and when the half-push switch 24 is turned OFF, it is checked in S512 whether or not there is a liquid crystal display with date 41. If there is a liquid crystal display with date 41, processing advances to S513 where the display in the liquid crystal display 4 is switched from the date display condition shown in FIG. 16 to the photographic frame number display condition shown in FIG. 17, photographic processing is terminated. When it is determined in S512 that there is no liquid crystal display with date 41, the processing of S513 is omitted.

When the charging of the strobe is completed, processing advances from S510 to S520. Even in the case where it is determined in S506 that strobe light emission is not required, processing advances to S520. In S520, it is determined whether or not the release switch 25 is ON.

In the case where it is determined in S520 that the release switch is OFF, processing advances to S530 where it is determined whether or not the half-push switch 24 is ON. When the half-push switch 24 is in the ON state, a return to S520 ensues where processing is conducted to determine whether or not the release switch 25 Is ON.

By putting the release button (not illustrated) in a half-pushed state, the processing of S520 and S530 is repeated after passing through S503. As stated above, in this state, the date display shown in FIG. 16 is conducted on the liquid crystal display 4 by the processing of S503. When the lens barrel is in a state of extension, the photographic frame number display shown in FIG. 17 is conducted on the liquid crystal display 4 by the processing of S206 of FIG. 10, but the user can switch the display to the date display shown in FIG. 16 by putting the release button into a half-pushed state. In this way, the user can confirm the date which is transcribed onto the film.

After conducting this confirmation, when the half-push switch 24 is turned OFF (when the half-pushed state of the release button is eliminated), processing advances to S531 where it is checked whether or not there is liquid crystal display with date 41. If "YES", the display of the liquid crystal display 4 is switched in S532 from the date display condition shown in FIG. 16 to the photographic frame number display condition shown in FIG. 17. Photographic processing is then terminated.

In the case where it is determined in S520 that the release switch 25 has been turned ON, processing advances to S521 where the display of the liquid crystal display 4 is switched from the date display condition shown in FIG. 16 to the photographic frame number display condition shown in FIG. 17.

Next, it is determined in S522 whether or not the self mode is set. In the case where the self mode is set, processing advances to S523 where a 10 second standby ensues. In the case where the self mode is not set, this processing of S523 is skipped.

Next, processing advances to S524 where lens drive processing is conducted. At this time, microcomputer 1 controls the lens drive circuit 11 and the photographic lens is moved to the specified position. Next, shutter opening/closing operation is conducted in S525, and the driving of the strobe is simultaneously conducted in the case where it is necessary to use the strobe. At this time, microcomputer 1 controls the shutter drive circuit 12, and the shutter is operated at the specified time. This operating time (opening time) is calculated by the processing of S504. Moreover, at this time, microcomputer 1 controls the strobe drive circuit 13, and induces the light emission of the strobe according to necessity.

Although not illustrated in the flow chart, the charging of the strobe is commenced after the strobe has conducted light emission, and the charging is stopped upon completion of charging.

Next, processing advances to S526 where lens return processing is performed. At this time, microcomputer 1 controls the lens drive circuit 11, and returns the photographic lens to its original position.

It is determined in S527 whether or not imprint mode OFF has been set. If OFF, processing advances to S541; if not OFF, processing advances to S528 where it is determined whether or not there is a liquid crystal display with date 41. If "YES", processing advances to S540; if "NO", processing advances to S541.

In S540, date imprint processing is performed. That is, in the case where the imprint mode is set to a setting other than OFF, microcomputer 1 outputs the date data obtained as a result of the clocking conducted by the built-in timer (the date is displayed on the liquid crystal display 4) to the date imprint circuit 10, and this is transcribed onto the film.

In this embodiment, the date is transcribed prior to winding up the film one frame, but it is also possible to transcribe the date in dot form during the winding (feeding) of the film by, for example, inducing the light emission of a plurality of LEDs (not illustrated).

Next, processing advances to S541 where it is determined whether or not the photographic frame number "n" has reached the final frame number (in the case of this embodiment, since the film has 36 exposures, n=37). In the case where it is determined that it has not yet reached the final frame, processing advances to S542 where film winding processing is conducted. At this time, microcomputer 1 controls the feed circuit 9 so that film winding is commenced.

In S543, it is determined whether or not the film has reached the film end part. In the case where it is determined that it has not yet reached the film end part, processing advances to S544 where it is determined whether or not the winding of one frame has been completed. In the case where the winding of one frame has not yet been completed, processing returns to S543 where it is determined whether or not the end has been reached. In S543 and S544, the determination of whether or not the film has reached the end, and the determination of whether or not the winding of one frame has been completed are executed by microcomputer 1 according to the detection results of the film frame feeding detection circuit 14.

When the winding of one frame has been completed, processing advances to S545 where the n value is incrementally changed by one only. As a result, the photographic frame number (the number 36 of FIG. 17 displayed on the liquid crystal display 4 is also incrementally changed.

Next, processing advances to S546 where the OFF of the half-push switch 24 is waited for (where the release of the pressure on the release button is awaited). When the half-push switch 24 is turned OFF, the 3 minute timer is started in S547, and photographic processing is terminated.

When it is determined in S541 that photography has been conducted until the final frame, or when it is determined in S543 that the end part of the film has been reached during the winding operation of the film, processing advances to S548 where a film rewinding process is performed. When the rewinding process of the film has been completed, photographic processing is terminated.

In the above embodiment, the position of the lens barrel is detected by the lens barrel position detection switch 26; when the lens barrel is in an extended position, the state mode is set to the operational mode; when in a retracted position, it is set to the non-operational mode. With regard to the state mode of the camera, it is also possible, for example, to set up a barrier in front of the photographic lens which is opened and closed between the position which allows light incidence relative to the photographic lens and the position which inhibits it; when this barrier is in a position allowing light incidence relative to the photographic lens, the operational mode is set; when in a position inhibiting it, the non-operational mode is set.

It is also possible to provide a control switch which is operated when turning the power source ON or OFF; when the power source is turned ON by the operation of such a control switch, the state mode is set to the operational mode; when the power source is turned OFF, the non-operational mode is set.

The above discussions of the embodiment of the present invention indicate that an LCD arrangement and control structure may be designed so that two types of liquid crystal display devices can be driven with an identical drive device. Consequently, it is necessary to produce only one type of drive device which enables reduction in cost. Moreover, since the display portions of the two types of display devices are similar, if not identical, one can conduct attachment to the drive device without any complicated wiring.

Although preferred embodiments of the present invention have been shown and described, it will be readily appreciated by those skilled in the art that many changes and modifications may be made to the embodiments without departing from the principles and spirit of the invention, the scope of which is defined in the claims and their equivalents.

What is claimed is:

1. A display device adapted for use with a camera equipped with circuitry for monitoring and controlling camera operation, the display device comprising:
    a display unit having a first display part which shows a photographic mode indication, a second display part which shows date and time information, and a connector which electronically connects said display unit to the circuitry;
    said connector being mounted parallel said first display part and said second display part, said second display part being mounted in close proximity to said connector,
    wherein said second display part comprises a plurality of units, said second display part including a wire passing through and between said plurality of units and connecting said first display part and the connector.

2. The display device as claimed in claim 1, wherein said connector and said second display part are positioned at a top portion of the camera and more towards a front surface of the camera than said first display part.

3. A display device adapted for use with a camera equipped with circuitry for monitoring and controlling camera operation, the display device comprising:
    a display unit having a first display part which shows a photographic mode indication, a second display part which shows date and time information, and a connector which electronically connects said display unit to the circuitry;
    said connector being mounted parallel said first display part and said second display part, in close proximity to said second display part and closer to said second display part than to said first display part,
    wherein said second display part comprises a plurality of units, said second display part including a wire passing through and between said plurality of units and connecting said first display part and the connector.

4. A display device adapted for use with a camera equipped with circuitry for monitoring and controlling camera operation, the display device comprising:
    a display unit having a first display part which shows a photographic mode indication, a second display part which shows date and time information, and a connector which electronically connects said display unit to the circuitry;
    said connector being mounted parallel said first display part and said second display part, and adjacent to said second display part,
    wherein said second display part comprises a plurality of units, said second display part including a wire passing through and between said plurality of units and connecting said first display part and the connector.

5. A camera assembly, comprising:
    a display unit having a first display part which shows a photographic mode indication, a second display part which shows date and time information, and a connector which electronically connects said display unit to a circuitry;
    a main camera substrate to control the first and second display parts with control signals;
    a liquid crystal display (LCD) display connection terminal electrically connected to said main camera substrate, to receive the control signals from said main camera substrate; and
    a connection unit mounted adjacent to said connector, to pass said control signals from said LCD display connection terminal to said display unit,
    wherein said second display part comprises a plurality of units, said second display part including a wire passing through and between said plurality of units and connecting said first display part and the connector.

6. A camera assembly according to claim 5, further comprising a keep plate having projections which overhang said display unit to maintain said display unit in place and mounted on said main camera substrate.

7. A camera including a main camera substrate which generates display control signals, the camera comprising:
    a display unit having a first display part which shows a photographic mode indication, and a second display part which shows date and time information, wherein said display control signals control said first and second display parts;
    a liquid crystal display (LCD) display connection terminal electrically connected to said main camera substrate, to receive said display control signals from said main camera substrate;
    a connection unit to pass said display control signals from said LCD display connection terminal; and
    a connector mounted adjacent to said connection unit and which passes said display control signals from said connection unit to said display unit;
    wherein said connector is mounted parallel to said first display part and said second display part, said second display part being mounted in close proximity to said connector,
    wherein said second display part comprises a plurality of units, said second display part including a wire passing through and between said plurality of units and connecting said first display part and the connector.

8. A camera as claimed in claim 7, further comprising autofocus light projection/receiving units arranged underneath and supported by said main camera substrate.

9. A camera as claimed in claim 7, further comprising:
- a front cover having a first surface which extends to a top portion of the camera and a first projection extending from said first surface;
- a rear cover having a second surface which extends to the top portion of the camera and a second projection extending from said second surface; and
- a window formed over said display unit and between said front and rear covers, and having first and second notches which respectively receive said first and second projections, to maintain said window in place;
- wherein a top surface of said window and said first and second surfaces form a single surface on the top portion of the camera.

10. A display device for a camera having circuitry for monitoring and controlling camera operation, the display device comprising:

- a display unit including
  - a first display part displaying a photographic mode indication,
  - a second display part displaying date or time information, the second display part including a plurality of segments, and
  - a connector electronically connecting said display unit to the circuitry, the connector being mounted along an edge of the display unit parallel said first display part and said second display part,
- wherein the second display part is mounted closer to the edge of the display unit along which the connector is mounted than the first display part, and
- wherein a wire from said connector first passes through and between the plurality of segments of the second display part and then connects to the first display part.

* * * * *